United States Patent
Sato

(10) Patent No.: US 6,688,676 B1
(45) Date of Patent: Feb. 10, 2004

(54) VEHICLE STRUCTURE WITH LOAD TRANSMISSION ELEMENTS

(75) Inventor: Manabu Sato, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/666,476

(22) Filed: Sep. 20, 2000

(30) Foreign Application Priority Data

Feb. 18, 2000 (JP) .......................................... 200-040986

(51) Int. Cl.$^7$ ............................. B60J 7/00; B60K 37/00; B60N 2/00; B60N 3/00; B60R 27/00
(52) U.S. Cl. ........................................ 296/189; 296/188
(58) Field of Search ................................ 296/189, 188, 296/204, 194, 30, 901, 181

(56) References Cited

U.S. PATENT DOCUMENTS

| | | | |
|---|---|---|---|
| 3,765,715 A | * | 10/1973 | Franchini |
| 3,940,176 A | * | 2/1976 | Ito et al. |
| 4,129,330 A | * | 12/1978 | Schwuchow |
| 4,186,957 A | * | 2/1980 | Lutze et al. |
| 4,557,519 A | * | 12/1985 | Matsuura |
| 5,002,333 A | * | 3/1991 | Kenmochi et al. |
| 5,346,276 A | * | 9/1994 | Enning et al. |
| 5,562,329 A | | 10/1996 | Srock et al. |
| 5,580,620 A | * | 12/1996 | Campbell et al. |
| 5,611,593 A | * | 3/1997 | Fukagawa et al. |
| 5,619,784 A | * | 4/1997 | Nishimoto et al. |
| 5,882,065 A | * | 3/1999 | Koiwa et al. |
| 5,992,921 A | | 11/1999 | Seki |
| 6,015,183 A | * | 1/2000 | Vlahovic |
| 6,209,948 B1 | * | 4/2001 | Mori et al. |

FOREIGN PATENT DOCUMENTS

| | | |
|---|---|---|
| DE | 43 35 501 | 4/1995 |
| DE | 197 24 557 | 12/1998 |
| EP | 0 622 289 | 11/1994 |
| EP | 0 878 379 | 11/1998 |
| JP | 58-80377 | 5/1983 |
| JP | 60-45179 | 3/1985 |
| JP | 1-87972 | 6/1989 |
| JP | 1-254476 | 10/1989 |
| JP | 1-158283 | 11/1989 |
| JP | 1-170078 | 11/1989 |
| JP | 4-334669 | 11/1992 |
| JP | 5-262263 | 10/1993 |
| JP | 5-270444 | 10/1993 |
| JP | 7-137660 | 5/1995 |
| JP | 7-144611 | 6/1995 |
| JP | 8-133132 | 5/1996 |
| JP | 9-99868 | 4/1997 |
| JP | 10-203422 | 8/1998 |
| JP | 11-189178 | 7/1999 |
| WO | WO98/39197 | 9/1998 |

\* cited by examiner

Primary Examiner—Stephen T. Gordon
Assistant Examiner—Scott Carpenter
(74) Attorney, Agent, or Firm—McDermott, Will & Emery

(57) ABSTRACT

A vehicle including a cabin and a centerline extending in forward and rearward directions and a transverse line intersecting the centerline. The vehicle includes a cross member extending in a first direction parallel to the transverse line. The vehicle also has an extruded floor that is connected to the cross member. The floor and the dash cross member partially define the cabin. The floor extends in a second direction, which is parallel to the centerline. The floor also has first and second side sills that are spaced from each other in the first direction and that extend in the second direction. Forward ends of the first and second side sills contact the cross member. At least one load-transmitting member is disposed between the cross member and the floor. Each one load-transmitting member applies an impact load from the cross member to the floor at a substantially right angle to the floor.

32 Claims, 18 Drawing Sheets

VEHICLE STRUCTURE WITH LOAD TRANSMISSION ELEMENTS

BACKGROUND OF THE INVENTION

1. Field of the Invention

The present invention relates to a vehicle structure and, more particularly, to a vehicle structure having a unique impact absorbing arrangement.

2. Description of Related Art

A vehicle structure is disclosed in JP-A 10-203422 in which extension members are provided in the vehicle structure. The extension members extend into front side members and are connected to a dash cross member and to a compression rod mounting reinforcement, which is also connected to the dash cross member. With this structure, an input load, which is received by front ends of the extension members, is well distributed to the dash cross member.

The dash panel, however, is constructed from pressed parts, which are relatively weak. Due to the weakness of the pressed parts, an extension member is provided along the lower surface of the vehicle floor. The extension member transmits an impact load to the floor as the pressed parts of the dash cross member are not relatively strong. Because the dash panel cannot widely distribute the input load, the extension member provides a path for the input load. To alleviate any distortion caused by the impact load being concentrated at the extension member, the extension member and its mounting sites must be reinforced, which negatively increases the weight of the vehicle.

SUMMARY OF THE INVENTION

There is a need for a vehicle structure having reduced weight that is capable of withstanding high impact loads.

There is also a need for a vehicle structure in which the passenger compartment is subject to a reduced cabin reaction force.

There is also a need for a vehicle structure that is capable of changing the direction of an impact load resulting from a frontal crash from a horizontal direction to a vertical direction.

These and other needs are satisfied by an embodiment of the invention, which provides a vehicle having a cabin and including a centerline extending in forward and rearward directions and a transverse line intersecting the centerline. The vehicle has a cross member extending in a first direction parallel to the transverse line. An extruded floor is connected to the cross member to partially define the cabin. The floor extends in a second direction, which is parallel to the centerline, and has first and second side sills, which are spaced from each other in the first direction and extend in the second direction. The first and second side sills have forward ends contacting the cross member. The vehicle also has at least one load-transmitting member disposed between the cross member and the floor. Each load-transmitting member applies an impact load from the cross member to the floor at a substantially right angle to the floor.

Additional advantages and novel features of the invention will be set forth in part in the following description, and, in part, will be apparent to those skilled in the art after examining the following or by practicing the invention. The advantages of the invention may be realized and attained via the instrumentalities and combinations particularly pointed out in the appended claims.

BRIEF DESCRIPTION OF THE DRAWINGS

Preferred embodiments of the invention will be described with reference to the attached drawings, which are incorporated in and constitute a part of the specification, in which.

DETAILED DESCRIPTION OF THE PREFERRED EMBODIMENTS

Figure 1:
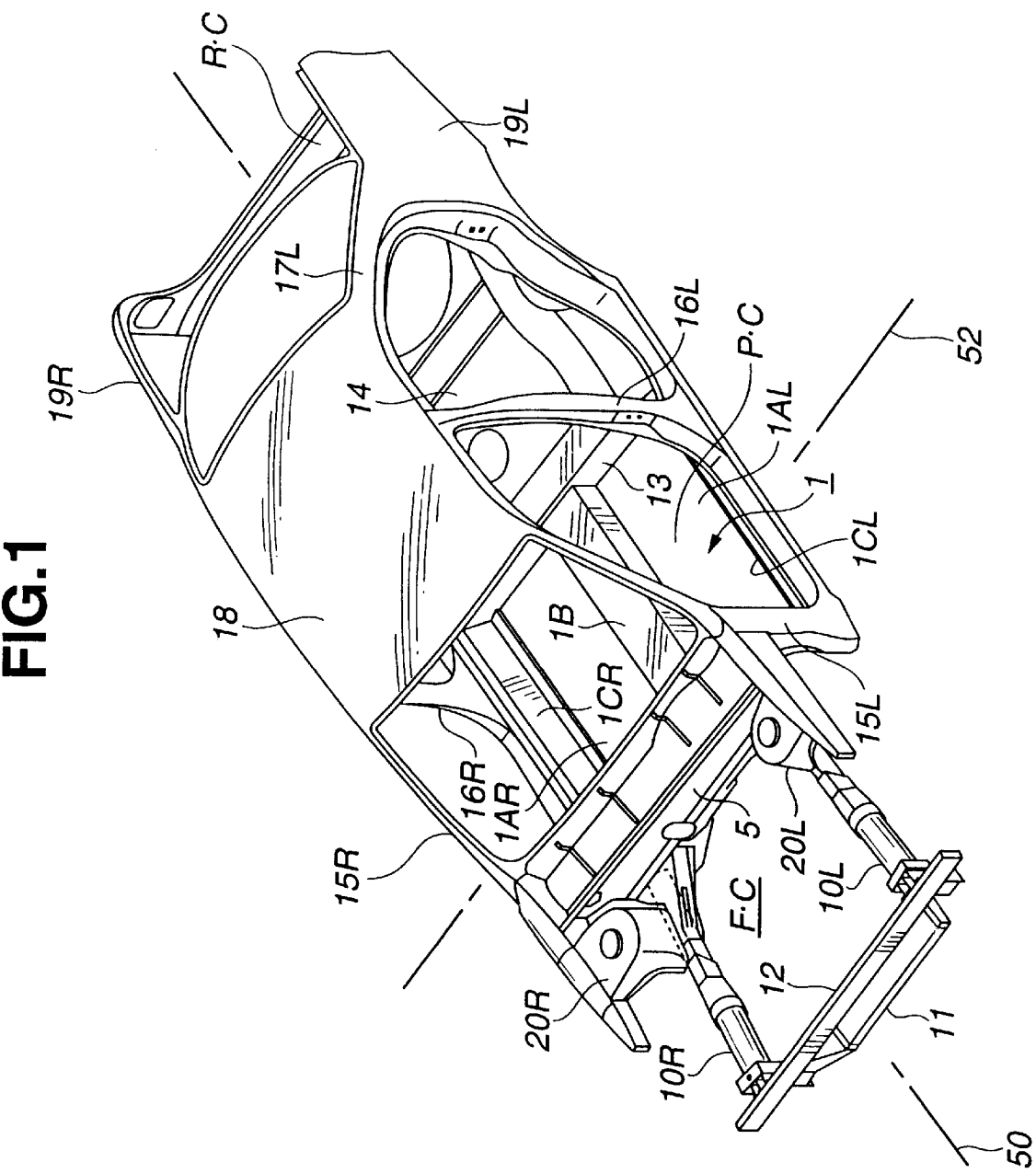
FIG. 1 is a perspective view of an exemplary vehicle to which the embodiments of the invention may be applied.

Referring now to the drawings, and initially to FIG. 1, there will be seen a vehicle superstructure or a vehicle body structure having a cabin or passenger compartment P•C, a front compartment F•C, and a rear compartment R•C. Each embodiment of the invention described herein is implemented in a forward portion of the vehicle and includes a dash cross member and an extruded floor. The present invention is equally applicable to a rearward portion of the vehicle including a rear cross member and a floor.

First Preferred Implementation

The first embodiment of the invention will now be described with reference to FIGS. 1 to 8. As shown in FIG.

1, the vehicle has a longitudinal centerline 50 and a transverse line 52, which is perpendicular to the longitudinal centerline 50. The vehicle body structure comprises an extruded floor 1 and a dash cross member 5. The floor 1 extends rearward from the dash cross member 5 along the longitudinal centerline 50. At its rear end, the floor 1 is connected to a rear seat cross member 13. A rear floor panel 14 is connected to and extends rearward from the rear seat cross member 13.

The vehicle body structure includes a left-hand front pillar 15L, a left-hand center pillar 16L, a left-hand rear pillar 17L, and a left-hand rear fender 19L, a right-hand front pillar 15R, a right-hand center pillar 16R, a right-hand rear pillar (not shown), a right-hand rear fender 19R, and a roof panel 18. The dash cross member 5, the floor 1, the front pillars 15L, 15R, the center pillars 16L, 16R, the rear pillars 17L, the rear seat cross member 13, the rear floor panel 14, and the roof panel 18 define a passenger cabin or compartment P•C.

A forward cross member 11 and a bumper armature 12 interconnect the forward end portions of front side members 10L and 10R. The front side members 10L and 10R, first cross member 11, strut housings 20L and 20R, and bumper armature 12 cooperate with each other to form an end structure for the front compartment F•C, which may serve as an engine room.

Figure 3:
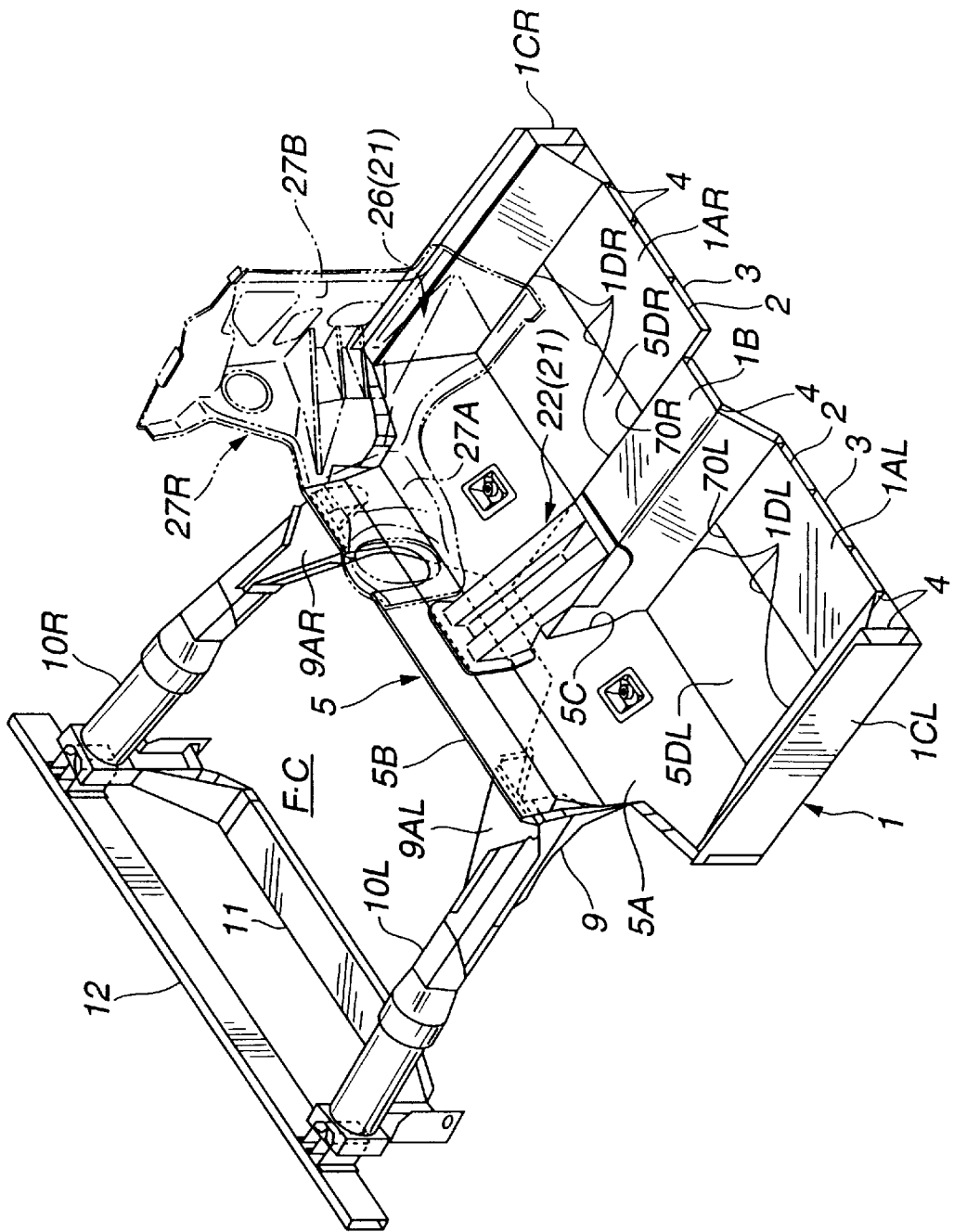
FIG. 3 is a perspective view of the front portion of the vehicle of FIG. 1 including the first embodiment of the present invention.

The floor 1 is formed by extruding a light metal material, such as an aluminum alloy, in a first direction, which is substantially parallel to the longitudinal centerline 50. As best seen in FIG. 3, the floor 1 has two spaced walls, that is, an upper wall 2 and a lower wall 3, and partitions or reinforcement walls 4 between the upper and lower walls 2, 3. The partitions 4 and the upper and lower walls 2, 3 define a plurality of parallel channels extending in a second direction, which is substantially parallel to the longitudinal centerline 50. The partitions 4 enhance the structural rigidity of the floor 1.

The floor 1 includes at least portions of a plurality of floor structural members, which extend rearward from the dash cross member 5 in the second direction. The plurality of structural members include a central tunnel 1B and a first or left-hand side sill 1CL spaced from the tunnel 1B in a first or leftward direction, which is substantially parallel to the transverse line 52. The plurality of structural members further includes a second or right-hand side sill 1CR spaced from the tunnel 1B in the first direction. The floor 1 includes a first or left-hand floor panel portion 1AL that extends between the tunnel 1B and the first side sill 1CL, and a second or right-hand floor panel portion 1AR that extends between the tunnel 1B and the second side sill 1CR.

The dash cross member 5 has a toe board section 5A and a vertically extending wall section 5B that extends from the toe board section 5A. A cutout 5C is formed substantially at the transverse midpoint of the toe board section 5A. Similar to the floor 1, the dash cross member 5 is formed by extruding a light metal material. The dash cross member S is extruded in the first direction, which is substantially parallel to the transverse line 52. The dash cross member S has two spaced walls, an inner wall 6 and an outer wall 7, and partitions 8 between the two spaced walls 6 and 7. The partitions 8 and the two spaced walls 6 and 7 cooperate with each other to define, between the two spaced walls 6 and 7, a plurality of parallel channels extending substantially parallel to the transverse line 52. The dash cross member 5 has the same cross sectional profile over its entire length along the transverse line 52. The partitions 8 enhance the rigidity of the dash cross member 5.

Figure 4:
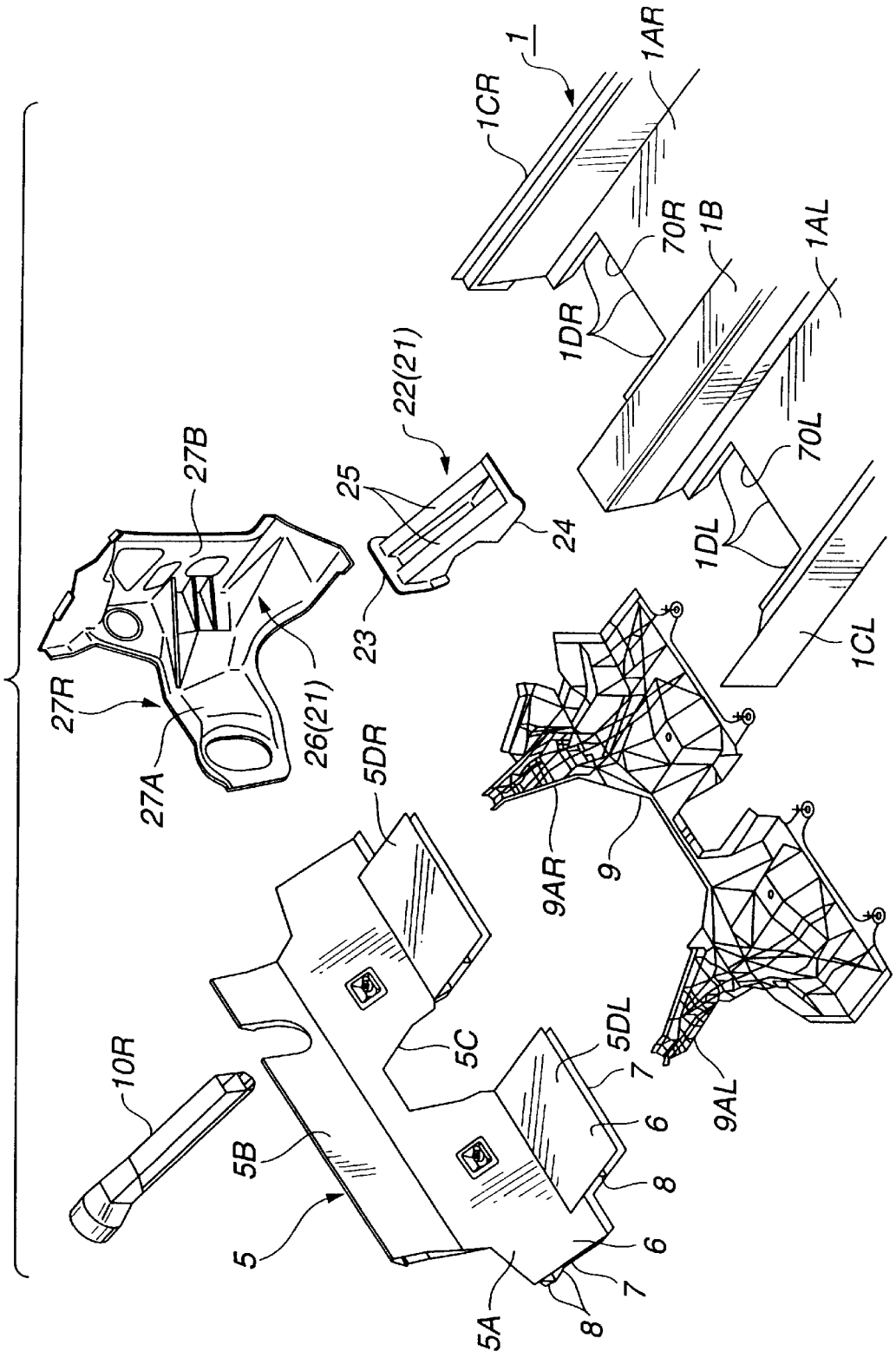
FIG. 4 is an exploded view of the vehicle structure shown in FIG. 3.

At best seen in FIG. 3, the cutout 5C in the dash cross member 5 receives the tunnel 1B of floor 1. Referring to FIGS. 3 and 4, a reinforcement structure 9 extends over the outer wall 7 from the vertically extending wall section 5B to the toe board section 5A. The reinforcement structure 9 has two arms, namely a left-hand arm 9AL and a right-hand arm 9AR, both of which extend in the forward direction substantially parallel to the longitudinal centerline SO. The two arms 9AL, 9AR are spaced along the transverse line 52 and fixedly support the front left-hand and the right-hand side members 10L, 10R.

With the cutout 5C coupled to the tunnel 1B, the toe board section 5A of the dash cross member 5 is brought into abutting contact with the forward ends of the side sills 1CL and 1CR. An appropriate welding technique, such as laser welding or metal inert gas (MIG) welding, may be used to weld the joint between the toe board section 5A and the forward ends of the side sills 1CL and 1CR and the joint between the cutout 5C and the tunnel 1B. As will be seen from the following description, a joint between the dash cross member 5 and each of the floor panel portions 1AL and 1AR is offset from the joint between the dash cross member 5 and the tunnel 1B or each of the side sills 1CL and 1CR.

The floor 1 has a first or left-hand recess that is recessed from the forward end of the floor 1 away from the dash cross member 5 between the tunnel 1B and the first side sill 1CL. The first recess has a forward edge 1DL that defines the rear edge of the first recess. The floor 1 includes a first or left-hand floor panel portion 1AL disposed between the tunnel 1B and the first side sill 1CL. The first floor panel portion 1A has at least a portion 70L of the first recess defining edge 1DL. The cross member 5 includes a first tooth 5DL that extends integrally or unitarily from the toe board section 5A toward the first panel portion 1AL. The first tooth 5DL engages the first recess and is connected to the floor 1 along the first recess defining edge 1DL.

The floor 1 has a second or right-hand recess that is recessed from the forward end of the floor away from the dash cross member 5 between the tunnel 1B and the second side sill 1CR. The second recess has a forward edge 1DR that defines the second recess rear edge of the second recess. The floor 1 includes a second or right-hand floor panel portion 1AR disposed between the tunnel 1B and the second side sill 1CR. The second floor panel portion 1AR has at least a portion 70R of the second recess defining edge 1DR. The cross member 5 includes a second tooth 5DR that extends integrally or unitarily from the toe board section 5A toward the second floor panel portion 1AR. The second tooth 5DR engages the second recess and is connected to the floor 1 along the second recess defining edge 1DR.

As shown in FIG. 3, the first and second recesses are rectangular. The first recess extends between a left-hand side lower edge of the tunnel 1B and an inner lower edge of the first side sill 1CL and in front of the first floor panel portion 1AL. Thus, the left-hand side lower edge of the tunnel 1B, the inner lower edge of the first side sill 1CL, and the forward end of the first floor panel portion 1AL cooperate with each other to complete the first recess defining edge 1DL. The second recess extends between a right-hand side lower edge of the tunnel 1B and an inner lower edge of the second side sill 1CR and in front of the second floor panel portion 1AR. Thus, the right-hand side lower edge of the tunnel 1B, the inner lower edge of the second side sill 1CR, and the forward end of the second floor panel portion 1AR cooperate with each other to complete the second recess defining edge 1DR.

Referring to FIG. 4, the first and second teeth 5DL, 5DR are integrally connected to the toe board section 5A near the lower edge of the toe board section 5A. The teeth 5DL, 5DR each extend toward, and parallel with, the respective first and second floor panel portions 1AL, 1AR. The first and second teeth 5DL, 5DR are each extruded concurrently with the other portions of dash cross member 5 and have a substantially uniform cross-section along the transverse line 52 and include a plurality of channels between the inner and outer walls 6, 7. These channels are separated by partitions 8, which interconnect the inner and outer walls 6, 7 to enhance the rigidity of the first and second teeth 5DL, 5DR. The first and second teeth 5DL, 5DR are inserted into the first and second recesses, respectively; are surrounded by first and second recess defining edges 1DL, 1DR; and are welded to the tunnel 1B, the floor panel portions 1AL, 1AR, and the side sills 1CL, 1CR.

The floor panel portions 1AL, 1AR each have a forward edge portion 70L or 70R of the recess defining edge 1DL or 1DR, and this portion is straight and extends substantially parallel to the transverse line 52. The tunnel 1B and the side sills 1CL, 1CR project forward beyond the forward edge portions 70L, 70R of floor panel portions 1AL, 1AR. Because the teeth 5DL, 5DR each have partitions 8 lying along the transverse line 52 (see FIG. 1), the forward portion of the floor 1 exhibits a reduction in flexure rigidity during a frontal crash.

An input load-transmitting structure 21 is operatively disposed between the dash cross member 5 and the floor 1. The load-transmitting structure 21 applies an input load, which the dash cross member 5 is subjected to through the side members 10L and 10R, to the inner surface of the floor 1 at generally right angles to bend the floor 1 outward or away from the vehicle cabin P•C.

Figure 2:
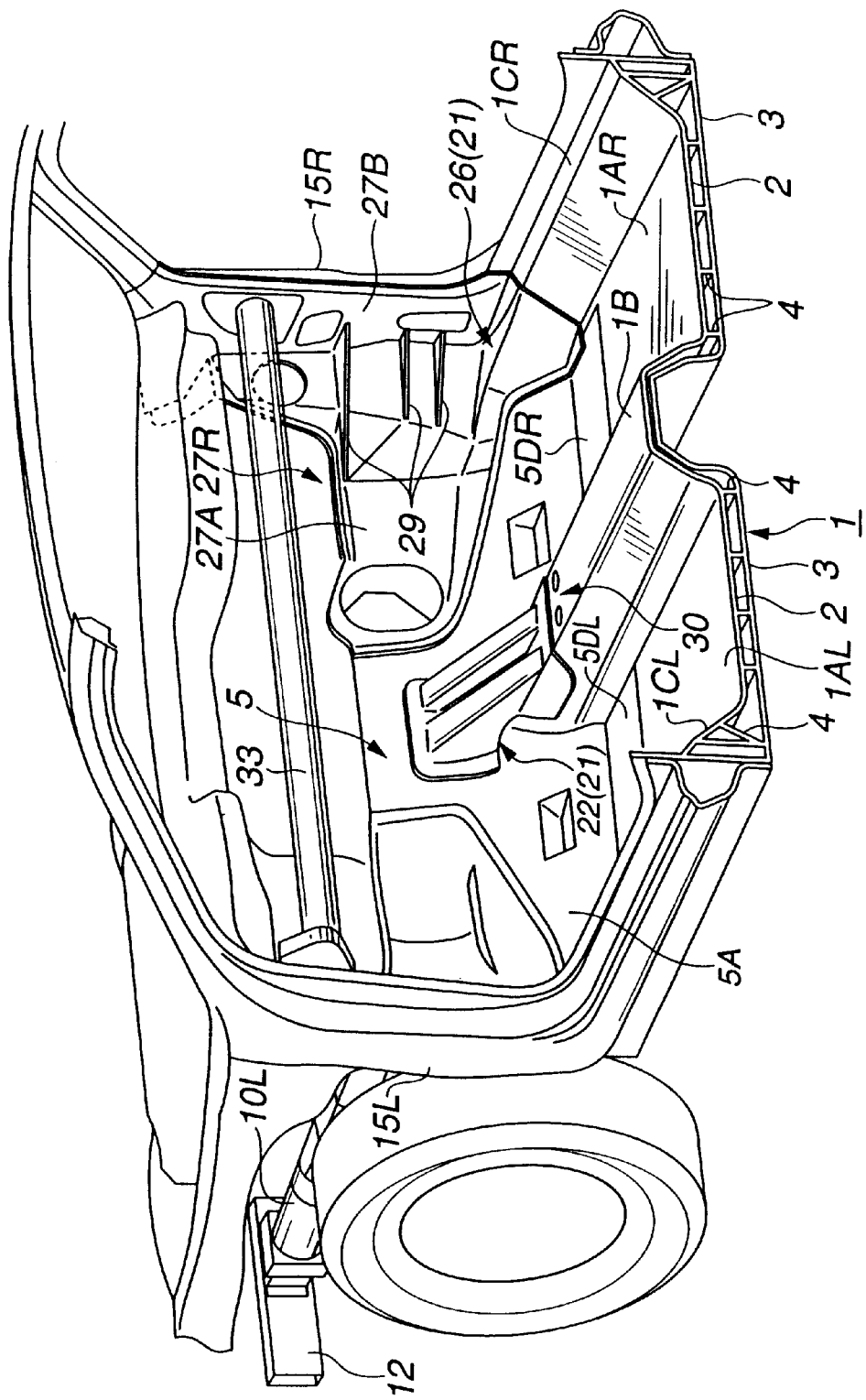
FIG. 2 is a sectional perspective view of the vehicle of FIG. 1 including a first embodiment of the present invention.

The input load-transmitting structure 21 includes at least a central portion and a pair of side portions. The central portion provides a load delivery path from the dash cross member 5 to the tunnel 1B. Each of the pair of side portions provides a load delivery path from the dash cross member 5 to one of the side sills 1CL, 1CR. According to the first preferred implementation of the present invention, the input load-transmitting structure 21 is arranged at or around a central or mid location of the floor 1 and the dash cross member 5. Referring to FIGS. 2 and 3, at the central location, the input load-transmitting structure 21 interconnects the dash cross member 5 and the upper surface, i.e., a surface portion of the inner wall 2, of the tunnel 1B. The input load-transmitting structure 21 is connected to a forward portion of the tunnel 1B that projects beyond the floor panel portions 1AL and 1AR toward the dash cross member 5.

Input load-transmitting structures may also be installed at the sides of the vehicle structure such that the input load-transmitting structure 21 connects the dash cross member and an inner side surface, i.e., a portion of the inner wall 2, of one of the side sills 1CL, 1CR. The input load-transmitting structure 21 is connected to a forward portion of the side sill 1CR, for example, that projects beyond the floor panel portions 1AL and 1AR toward the dash cross member.

Each input load-transmitting structure 21 has a flexure rigidity that is higher than the flexure rigidity of the forward portion of the corresponding one of the tunnel 1B, side sill 1CL, and the side sill 1CR.

In this first embodiment, the input load-transmitting structure 21 is comprised composed of a central reinforcement member 22 and a pair of side reinforcement members, only a right-hand one being shown at 26 in FIGS. 2, 3 and 4. The central reinforcement member 22 is connected to the dash cross member 5 and also to the tunnel 1B in such a manner as to bridge them. During a frontal crash, the dash cross member 5 is subject to an input load through the front side members 10L and 10A. During such a full frontal lap crash, the reinforcement member 22 rotates clockwise as viewed from the left-hand side of the vehicle, which transfers the input load from a generally horizontal direction downward to a substantially vertical force that acts on tunnel 1B at substantially right angles.

The reinforcement member 22 includes a bracket 23 that is joined (e.g., by welding) to the inner wall 6 of the dash cross member 5. The reinforcement member also includes a bracket 24 that is joined (e.g., by welding) to an upper side portion of the inner wall 2 of the tunnel 1B. A pair of reinforcement beads 25 interconnect the brackets 23, 24.

The side reinforcement members 26 are integral parts of the dash side panels 27R (note that only one of the dash side panels is shown, but that the vehicle also has another dash side panel 27L that is not shown). The side reinforcement members 26 each extend downward from a lower side of the respective dash side panels 27R.

Figure 5:
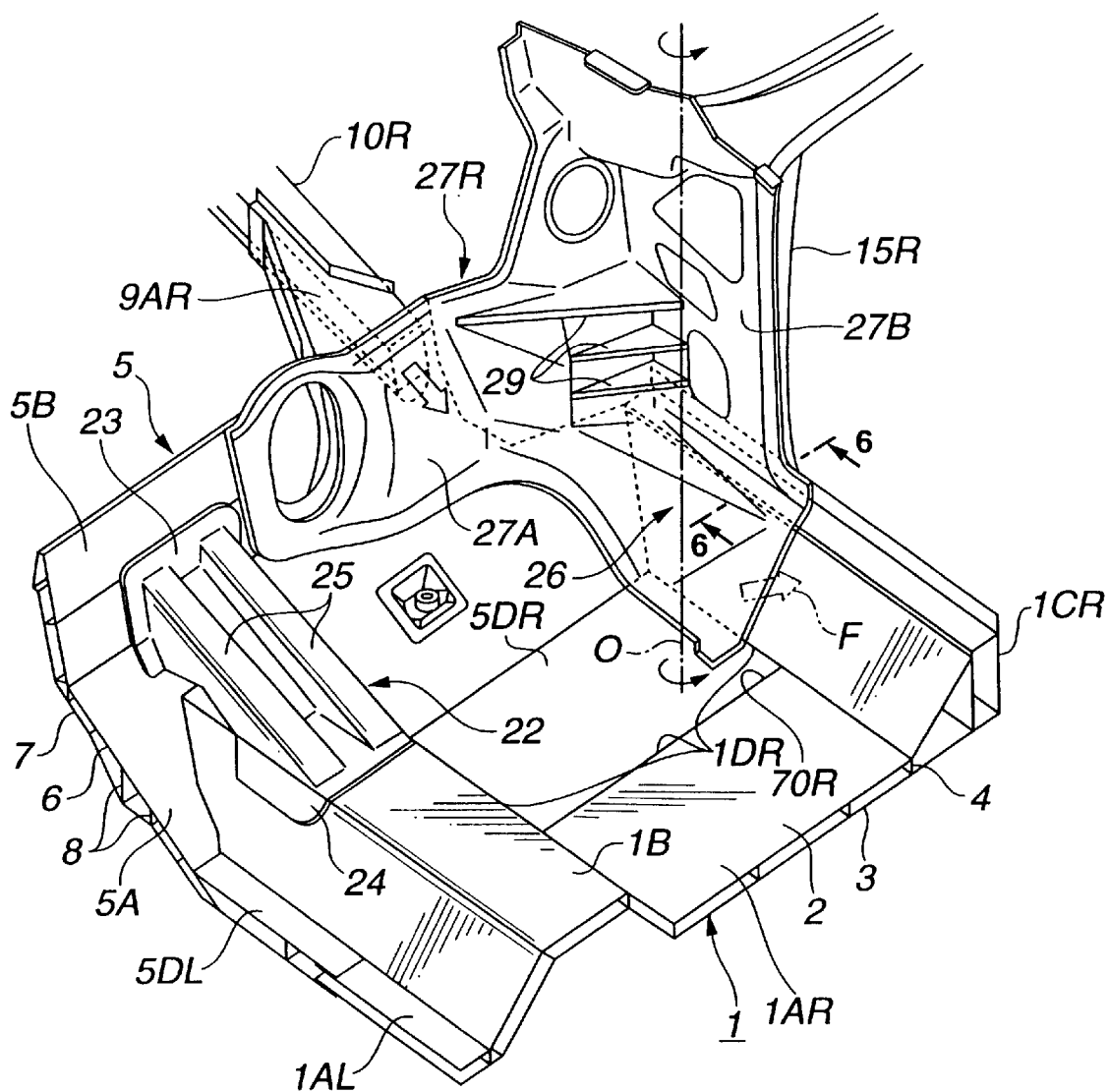
FIG. 5 is a fragmentary view of FIG. 2.
Figure 6:
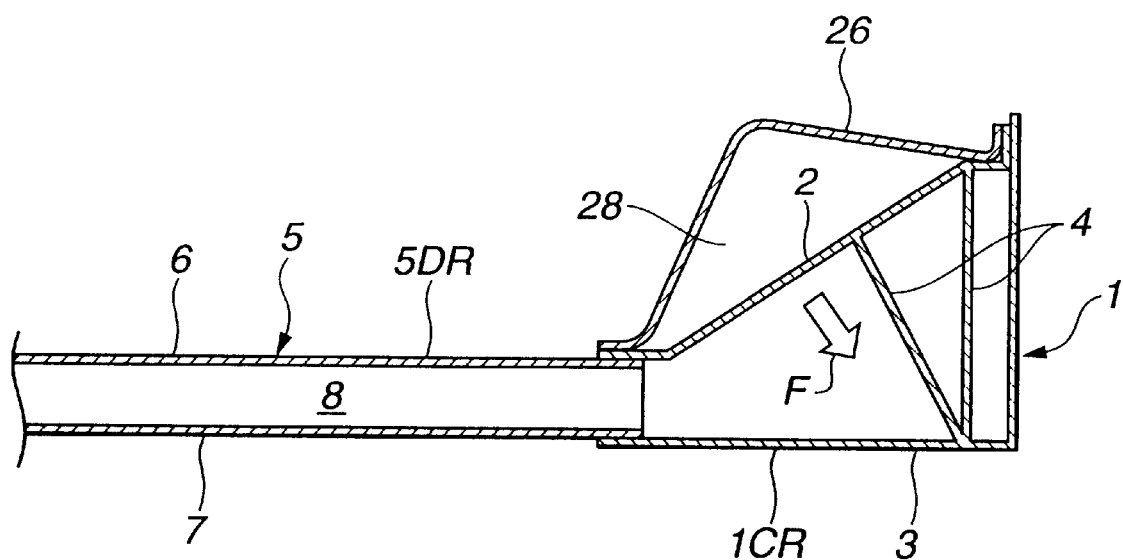
FIG. 6 is a section taken through the line 6—6 of FIG. 5.

As shown in more detail in FIGS. 5 and 6, the side reinforcement member 26R extends over lower portions of the dash cross member 5 and front pillar 15R and the forward end portion of the side sill 1CR. As best seen in FIG. 6, the side reinforcement member 26R protrudes inwardly of the passenger cabin P•C to define a closed cross sectional configuration 28. The closed cross-sectional configuration 28 is connected to a corner where the dash cross member 5, front pillar 15R and side sill 1CR meet each other. The closed cross-sectional configuration 28 extends diagonally over the corner from the dash cross member 5 toward the forward end portion of the side sill 1CR. The other reinforcement member has the same structure as reinforcement member 26R, but is a mirror image.

The dash side panel 27R includes a front panel section 27A lying along the dash cross member 5 and a side panel section 27B lying along the front pillar 15R. At a corner where the front and side panel sections 27A and 27B meet each other, the dash side panel 27R has a plurality of generally triangular ribs 29 vertically spaced one after another. As best seen in FIG. 5, on the side panel section 27B, the triangular ribs 29 have their end points aligned on a vertical straight line O. The provision of the vertically spaced ribs 29 facilitates rotation of the dash side panel 27R about the straight line O when, during a frontal crash, the dash cross member 5 is subject to the input load through the front side members 10L and 10R.

As demonstrated, the input load-transmitting structure 21 includes a central reinforcement member 22, which is constructed from elongate members in the form of reinforcement beads 25. Each of the reinforcement beads 25 is highly rigid. The load-transmitting structure 21 also comprises a pair of side reinforcement members (e.g., 26R) that comprise a plate member that is more rigid than the point where the side reinforcement member 26R of the load-transmitting structure 21 joins the side sill 21R of floor 1.

Figure 7:
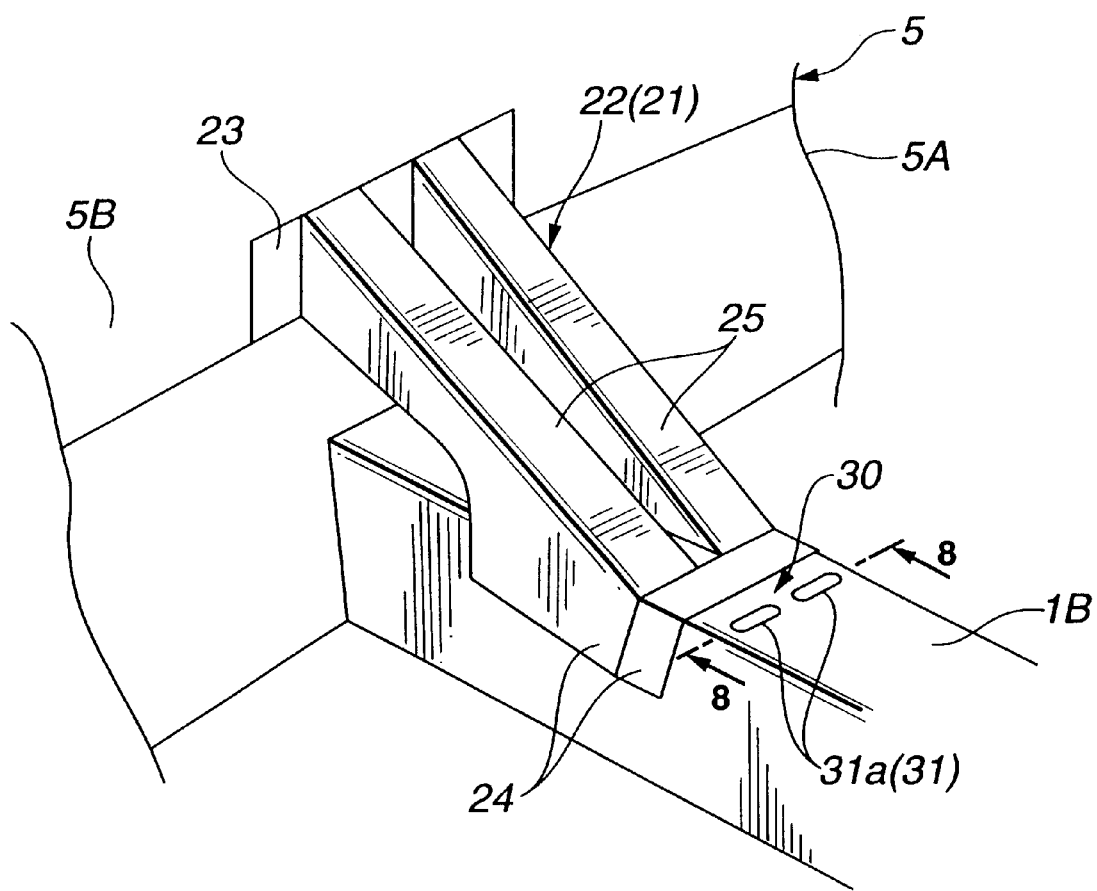
FIG. 7 is a fragmentary view of FIG. 5.
Figure 8:
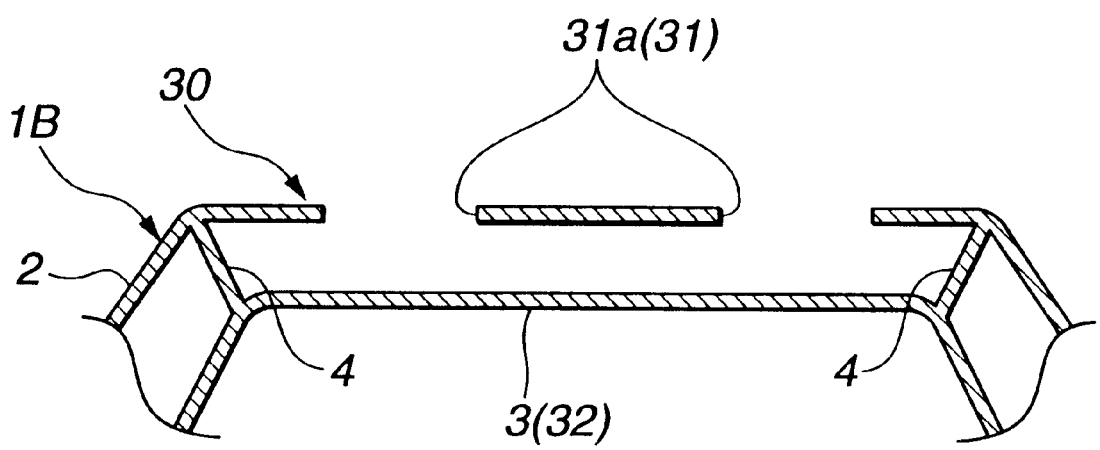
FIG. 8 is a section taken through the line 8—8 of FIG. 7.

As shown in FIGS. 7 and 8, the tunnel 1B has an accelerator portion 30 and a limit structure 32 where the reinforcement member 22 joins the tunnel 1B. The accelerator portion 30 initiates deformation of the tunnel portion 1B, and the limit structure 32 limits rotation of the reinforcement member 22. Similarly, each of the side sills 1CL, 1CR has accelerator portions 30 and limit structures 32, respectively, at portions where the side reinforcement members 26 join the side sills 1CL, 1CR. The accelerator portions 30 of the side sills 1CL, 1CR initiate deformation and the limit structures 32 limit rotation of the side reinforcement members 26.

Figure 9:
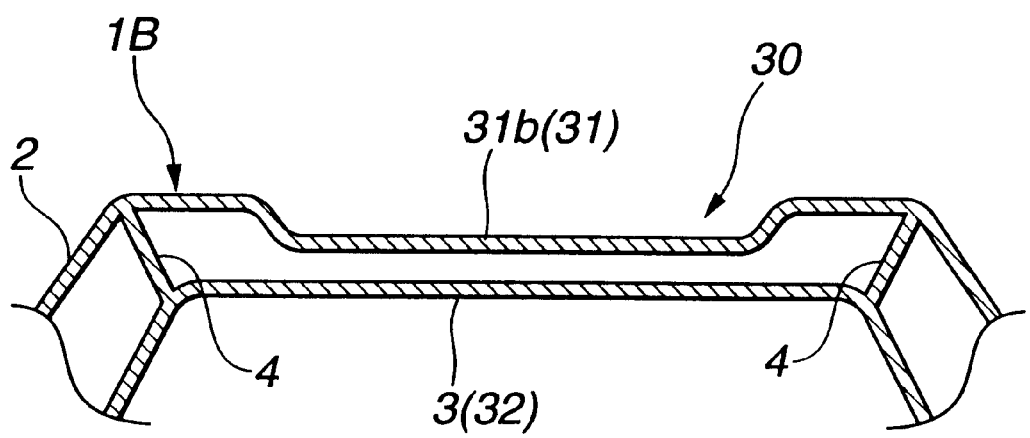
FIG. 9 is a modified section of FIG. 8.

The accelerator portion 30 and the limit structure 32 will now be described with reference to FIGS. 7 to 9. The accelerator portion 30 is in the form of a weak portion 31, which is formed within the upper surface of the tunnel 1B. The weak portion 31 has a variation in rigidity between the inner and outer walls 2, 3, which is created by reducing the thickness of the inner wall 2 and increasing the thickness of the outer wall 3. As best seen in FIG. 8, the weak portion 31 may include a plurality of apertures 31a formed within the inner wall 2 at the upper surface of the tunnel 1B. Alternatively, as seen in FIG. 9, the weak portion 31 may be comprised of a recess 31b formed within the inner wall at the upper surface of the tunnel 1B.

Making the outer wall 3 thicker than the inner wall 2 forms the limit structure 32. Rotation of the reinforcement 22 during a frontal crash first deforms the inner wall 2 toward the outer wall 3 until the inner wall abuttingly engages the outer wall 3.

According to the first embodiment, during a frontal crash, the dash cross member 5 is subject to an input load through the front side members 10L and 10R. The input load-transmitting structure 21, which includes the reinforcement members 22 and 26, applies the input load to the tunnel 1B and the side sills 1CL and 1CR of the floor 1 at substantially right angles to bend each outwardly of the vehicle cabin P•C. As a result, the amount of energy absorption due to deformation of the floor 1 in the bending direction adds to the amount of energy absorption due to deformation of the front side members 10L and 10R in their longitudinal direction.

According to the first embodiment, the load is applied to the floor 1 at substantially right angles to the surface portions to facilitate deformation of the floor 1 toward the exterior of the passenger cabin. The reaction of the vehicle cabin to the input load can be suppressed to a sufficiently low level because of the deformation of the floor 1 in the bending direction. Thus, a reduction in the cross sectional area of the floor 1 is no longer needed.

Figure 10A:
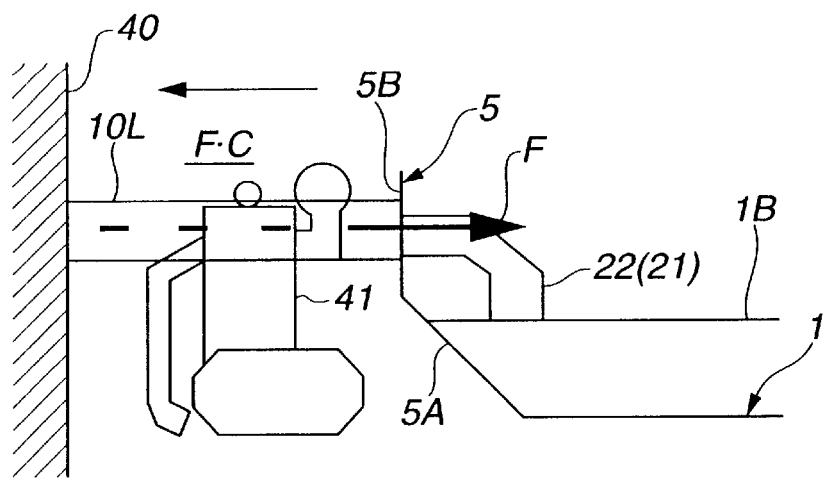
FIGS. 10A to 10C are schematic side views illustrating three consecutive states of the first embodiment during a frontal crash.
Figure 10B:
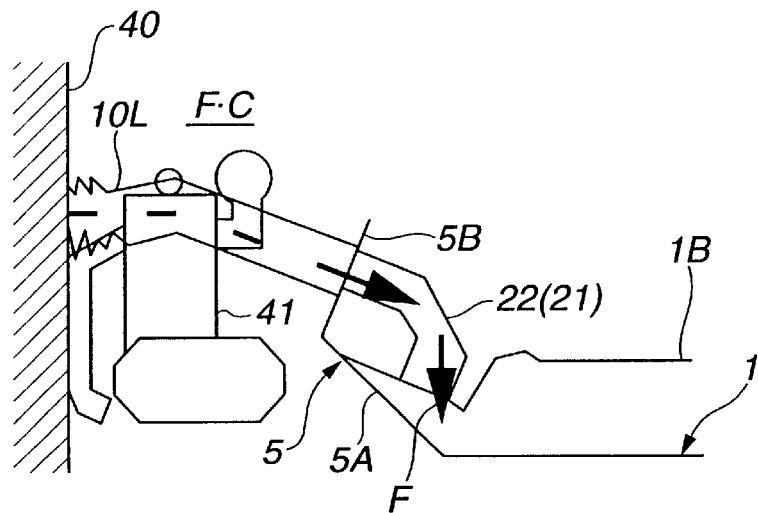
Figure 10C:
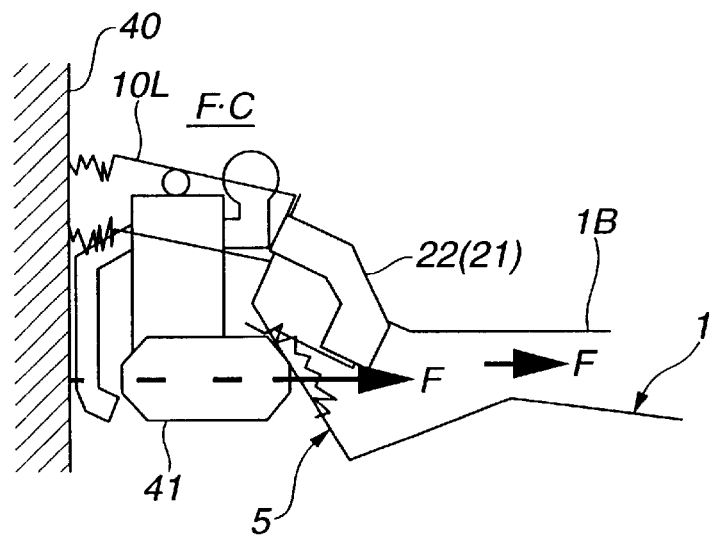

FIGS. 10A to 10C schematically illustrate the tunnel 1B buckling at different stages of a full frontal lap crash. FIG. 10A illustrates the input load F being transmitted through the front side members 10L, 10R, the dash cross member 5 and then the reinforcement member 22 during a frontal crash against a barrier 40. Subsequently, as shown in FIG. 10B, the dash cross member 5 supports the front side members 10L, 10R to ensure that the front side members 10L, 10R deform from their forward ends in the longitudinal direction. At the same time, the dash cross member 5 deforms toward the cabin thereby causing the reinforcement member 22 to rotate clockwise as shown in FIG. 10B, which causes the input load F to be applied downward on the upper surface of the tunnel 1B at a substantially right angle.

The dash cross member 5 is sufficiently rigid because it is extruded substantially parallel to the transverse line 52. As a result of the sufficiently high rigidity of the dash cross member 5, the front side members 10L, 10R deform from their forward ends in the longitudinal direction. In addition, the dash cross member 5 distributes the input load to the front pillars 15L, 15R, thereby suppressing the longitudinal application of the load to the floor 1.

In the first embodiment, the flexure rigidity of the reinforcement member 22 is higher than the flexure rigidity of the portion where the reinforcement member 22 joins the tunnel 1B. Thus, the reinforcement member 22 is able to change the direction of the input load applied to the dash cross member 5 before the input load is applied to the tunnel 1B. When the input load F is applied to the upper surface of the tunnel 1B, the inner wall 2 begins to deform toward the outer wall 3, which tends to cause the tunnel 1B to bend downward or away from the interior of the passenger cabin. The accelerator portion 30 further causes the tunnel 1B to bend downward or away from the passenger cabin. Thus, the accelerator portion 30 serves to deform the tunnel 1B downward to complete the required downward deformation of the tunnel 1B prior to the time at which the engine 41 and the transmission elements (not shown) contact the dash cross member 5.

At the initial stage of the downward deformation of tunnel 1B, the rotation of the reinforcement member 22 is limited by its abutting engagement with the relatively thick outer wall 3. As a result, the angle of rotation of the reinforcement member 22 is limited to the minimum amount that is required to initiate the deformation of tunnel 1B. Thus, the amount of inclination of the dash cross member 5 toward the cabin is limited to the required minimum.

Immediately after the engine 41 and the transmission elements contact the dash cross member 5, as shown in FIG. 10C, the load transmission path through the engine 41 from the barrier to the dash cross member 5 is the shortest. Thus, the engine 41 becomes the input load-transmitting member that transfers the input load F to the dash cross member 5. The input load is then applied to the floor 1 along the longitudinal centerline 50 (see FIG. 1). Before the load is applied to the floor, the forward end portion of the floor 1 has been deformed in a bending direction so that the buckling rigidity of the floor 1 is lowered, which lowers the amount of load that must be applied to initiate buckling of the floor 1. As a result, impact energy is absorbed effectively.

Figure 11A:
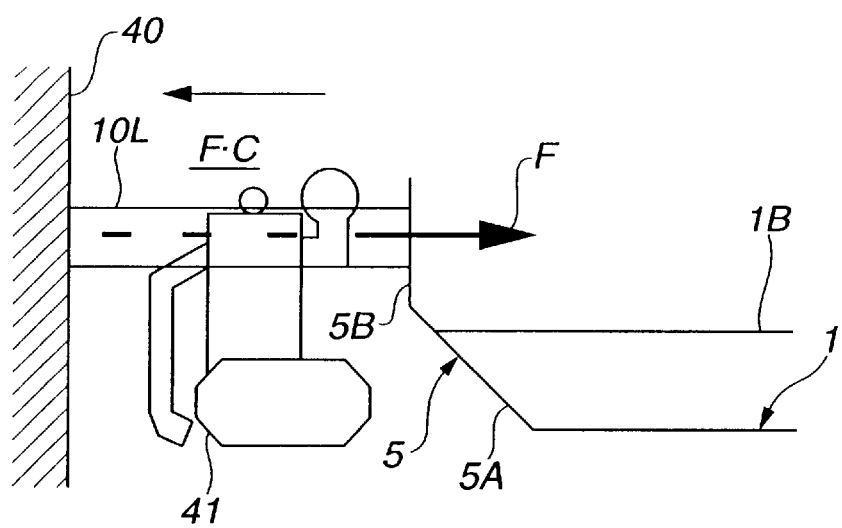
FIGS. 11A to 11C are similar views to FIGS. 10A to 10C, respectively, of the parts of a prior art example.
Figure 11B:
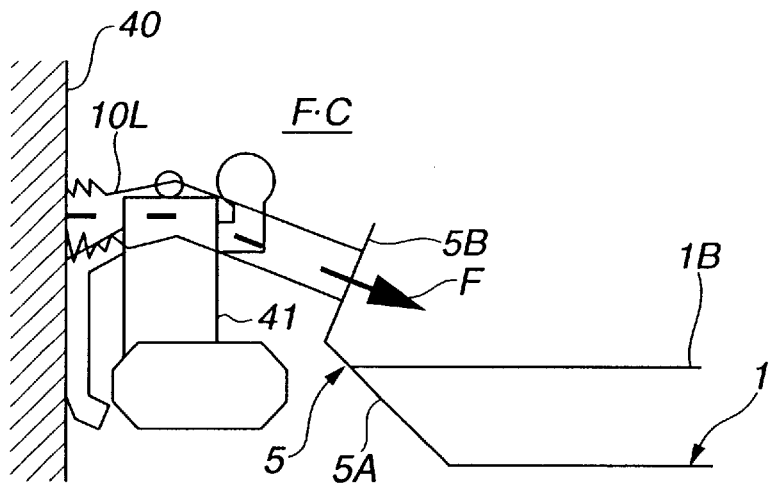
Figure 11C:
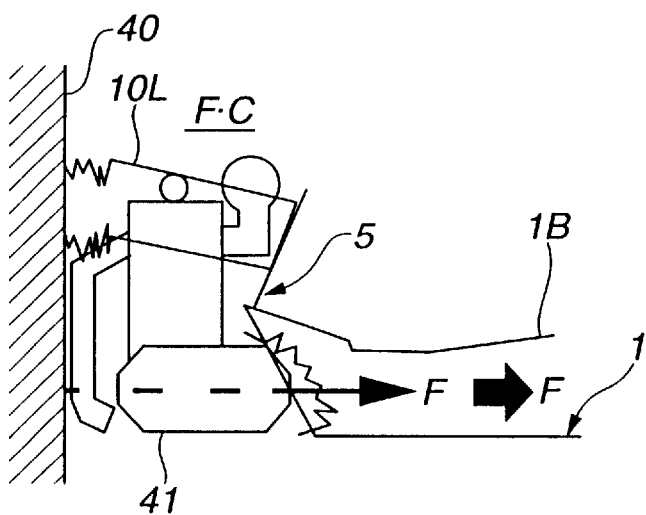

In contrast to the situation of FIGS. 10A to 10C, which illustrates the action of the first embodiment of the invention, FIGS. 11A to 11C illustrate tunnel 1B buckling at different stages during a frontal crash of a vehicle where a reinforcement member is not used. After the stages shown in FIGS. 11A and 11B, during a frontal crash, the engine 41 and the transmission elements contact the dash cross member 5 as shown in FIG. 11C. Upon and immediately after this contact, the input load F is applied to the floor 1 along the central longitudinal line 50. The floor 1 is not yet deformed, which causes an increase in the load level required to initiate buckling of the floor 1. The load level is heavily dependent on the cross-sectional area of the floor 1 and is thus relatively high. Thus, a peak vehicle cabin reaction is relatively high during impact energy absorption.

The deformation of the sides of the vehicle will now be described with reference to FIGS. 5 and 6. During a frontal crash, the dash cross member 5 is subject to input load F. The dash side panels 26R rotate about the straight line O due to the rearward deformation of the dash cross member 5, which is the same as the rotation of the integral reinforcement members 26R. This causes the input load F to be applied to the side surfaces on the inner wall 2 of the side sills 1CL, 1CR substantially at right angles to bend them away from the passenger compartment.

Figure 12:
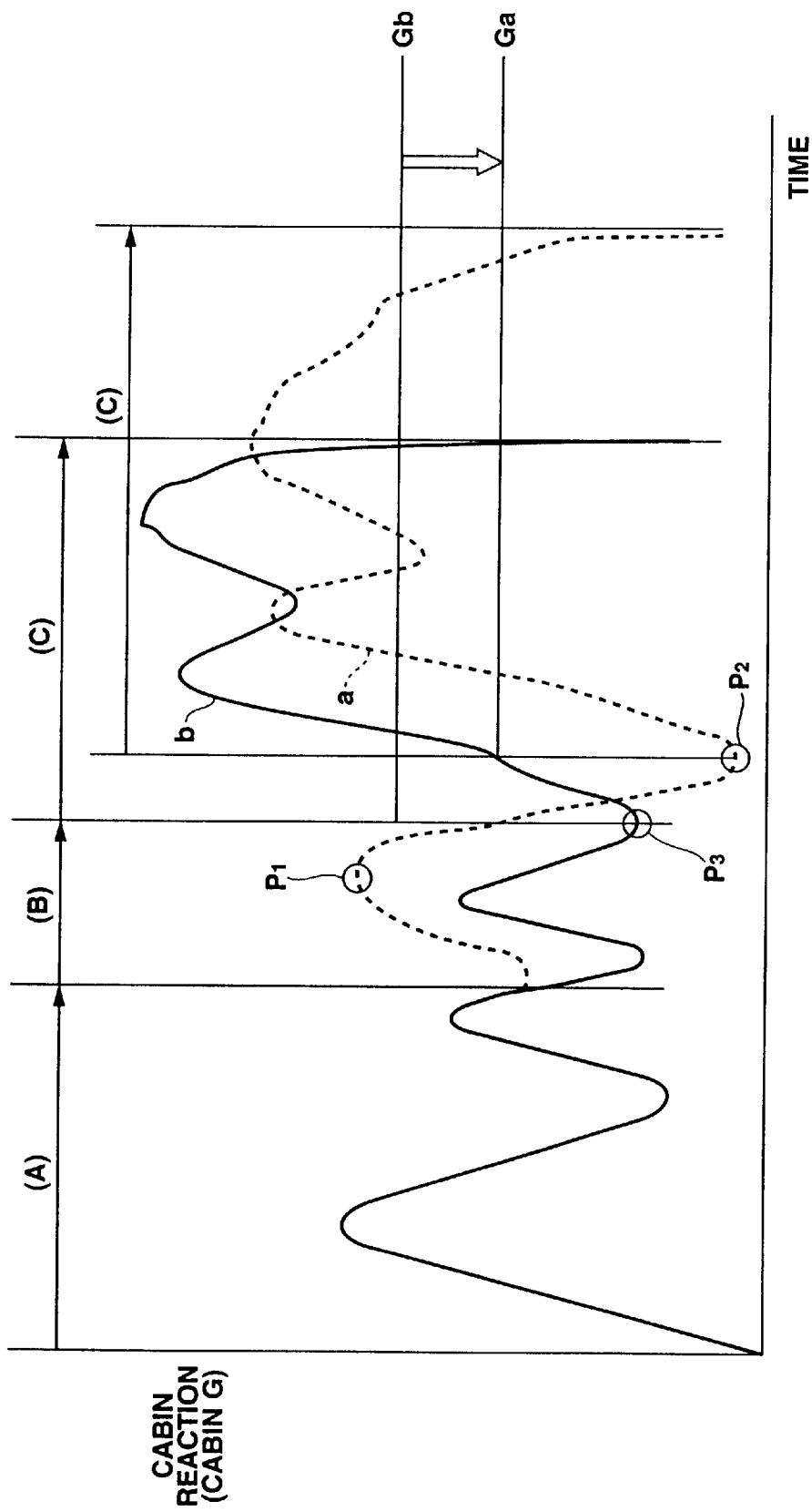
FIG. 12 is a graph of a frontal crash test conducted with a vehicle constructed according to the first embodiment of the invention compared to a full frontal lap crash conducted with a vehicle constructed according to the prior art example of FIGS. 11A to 11C.

Referring to FIG. 12, curve "a" shows the vehicle cabin reaction (cabin G) of the first embodiment during a frontal crash. Curve "b" shows the vehicle cabin reaction of the comparative example of FIG. 11 (i.e., a load-transmitting structure is not provided) during a frontal crash. FIGS. 10A and 11A correspond to region (A) in FIG. 12. FIGS. 10B and 11B correspond to region (B) in FIG. 12. FIGS. 10C and 11C correspond to region (C) in FIG. 12. Region (A) shows the cabin reaction during deformation of front side members 10L and 10R. Region (B) shows the cabin reaction during the rearward deformation of the dash cross member 5 toward the cabin. Region (C) that begins with time $P_2$ and shows the cabin reaction during contact of the engine 41 with the dash cross member 5 according to the first embodiment. Region (C) that begins with the time $P_3$ shows the cabin reaction during contact of the engine 41 with the dash cross member 5 according to the comparative example. In FIG. 12, $P_1$ is the time at which the floor 1 begins to buckle. $P_2$ is the time at which the engine 41 contacts the dash cross member 5 in the first embodiment. $P_3$ is the time at which the engine 41 contacts the dash cross member 5 in the comparative example.

A comparison of curves "a" and "b" reveals that, during region (A), there is no difference between the first embodiment and the comparative example. In region (B), the cabin reaction drops more after the floor 1 begins to buckle in the first embodiment than it does in the comparative example. Also, the average cabin reaction Ga of the first embodiment in region (C) is lower than the average cabin reaction Gb of the comparative example. Accordingly, the average cabin reaction has been reduced from Gb to Ga as a result of the input load-transmitting structure 21.

Figure 13:
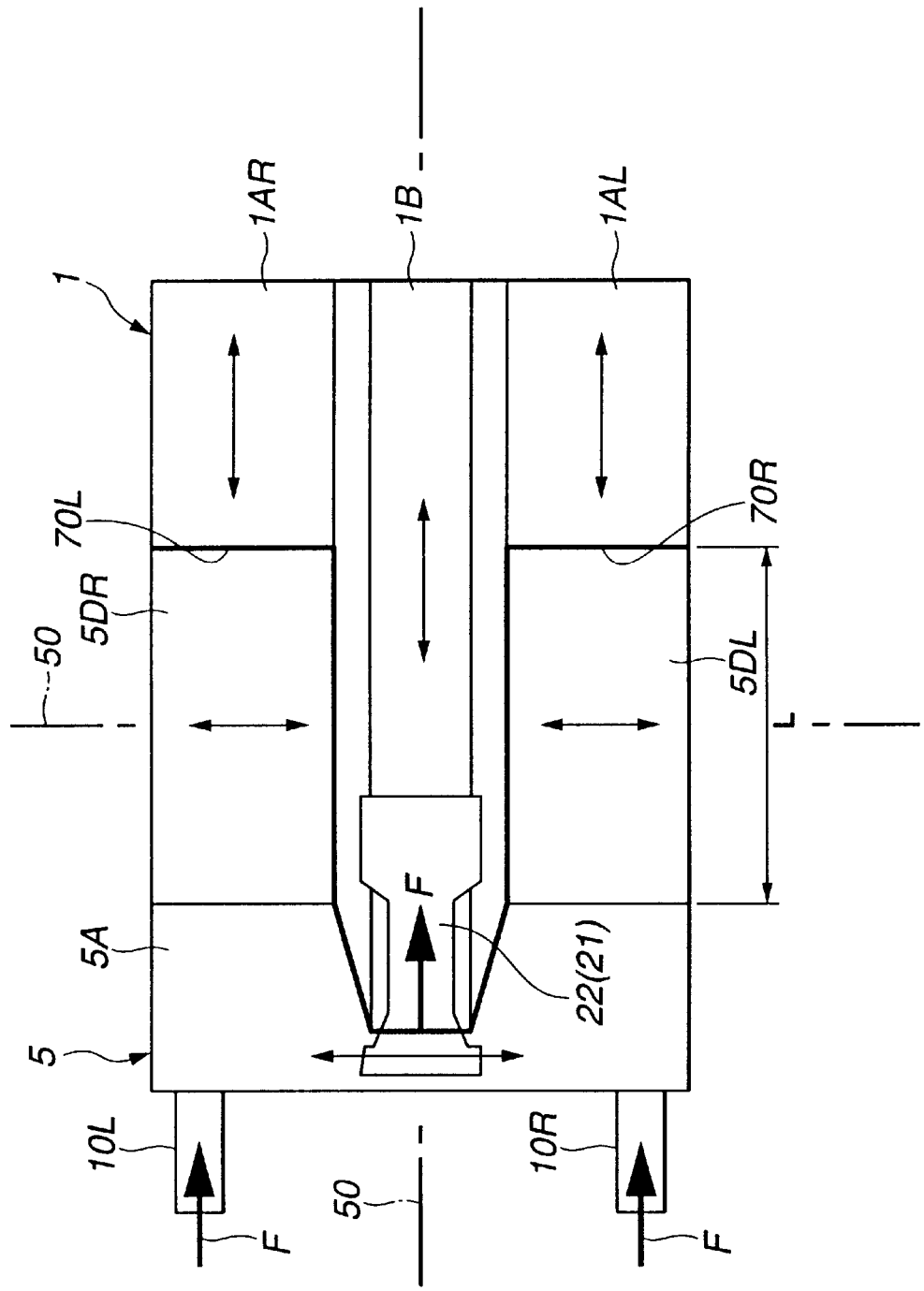
FIG. 13 is a simplified schematic plan view of the relationship between the front side members, the dash cross member and the floor of the first embodiment of the invention.
Figure 14:
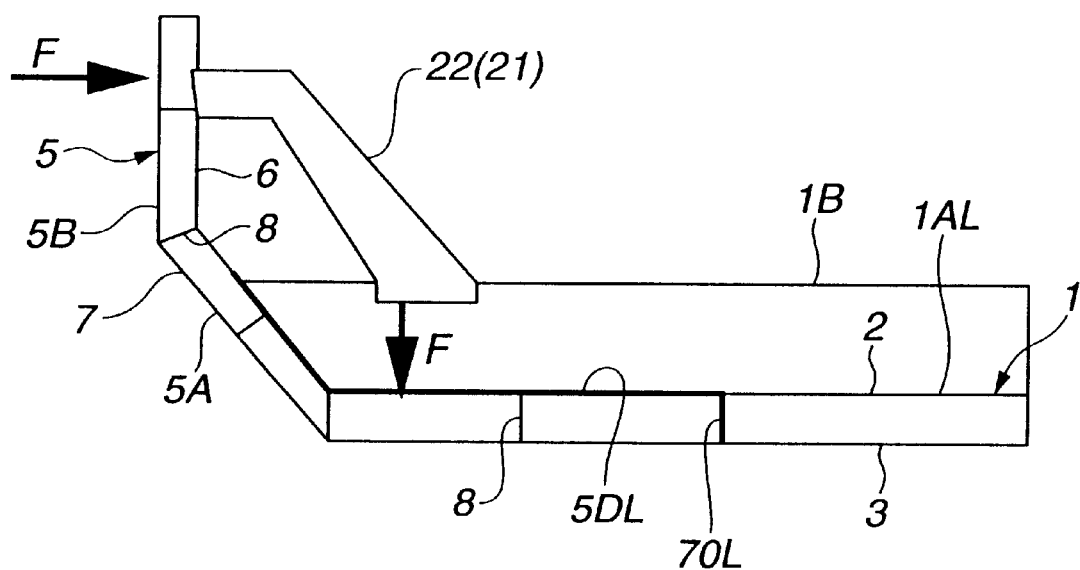
FIG. 14 is a simplified schematic side view of the dash cross member and the floor of FIG. 13.

Referring now FIGS. 3 and 13 to 15, the floor 1 includes a first recess that is recessed inwardly between the left-hand side sill 1CL and the tunnel 1B and a second recess that is recessed inwardly between the right-hand side sill 1CR and the tunnel 1B. The dash cross member 5 includes a pair of teeth 5DL, 5DR that are formed integrally to the toe boar section 5A. Each tooth 5DL, 5DR is inserted into the corresponding recess of floor 1. The input load-transmitting structure 21 connects the dash cross member 5 and a forward end of floor 1. The forward end portion of floor 1 to which the input load-transmitting structure 21 is connected extends beyond the first and second floor panel portions 1AL, 1AR toward the toe board section 5A. In FIG. 13, the two heads arrows indicate the directions in which the floor 1 and the dash cross member 5 are extruded. The integral portions 5DL, 5DR are extruded in the first direction, whereas the floor panel portions 1AL, 1AR are extruded in the second direction. The forward end portion of the floor 1 to which the reinforcement members 22, 26 are connected has a lower flexure rigidity than the floor panel portions 1AL, 1AR. As a result of this construction, the forward end portion of the floor 1 is able to deform during the initial stages of a frontal crash even though the magnitude of the input load is still quite low, which results in a further reduction in cabin reaction.

Figure 15:
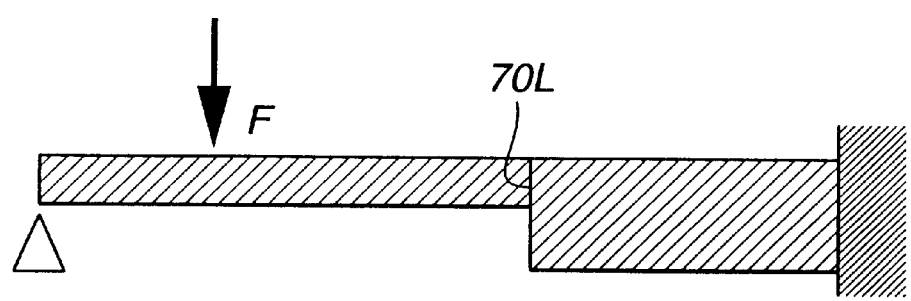
FIG. 15 is a beam model of the structure shown in FIGS. 13 and 14.

FIG. 15 shows a simplified beam model that demonstrates the relationship between the teeth 5DL, 5DR and the floor panel portions 1AL and 1AR. As seen from FIG. 15, the teeth 5DL, 5DR are smaller than the floor panels 1AL, 1AR and the former is less rigid than the latter. Thus, if the input load is applied at a substantially right angle to the upper surface of tunnel 1B, the forward end portion of the floor 1 is deformed downward while the input load is still low, which results in a reduced cabin reaction.

Figure 16:
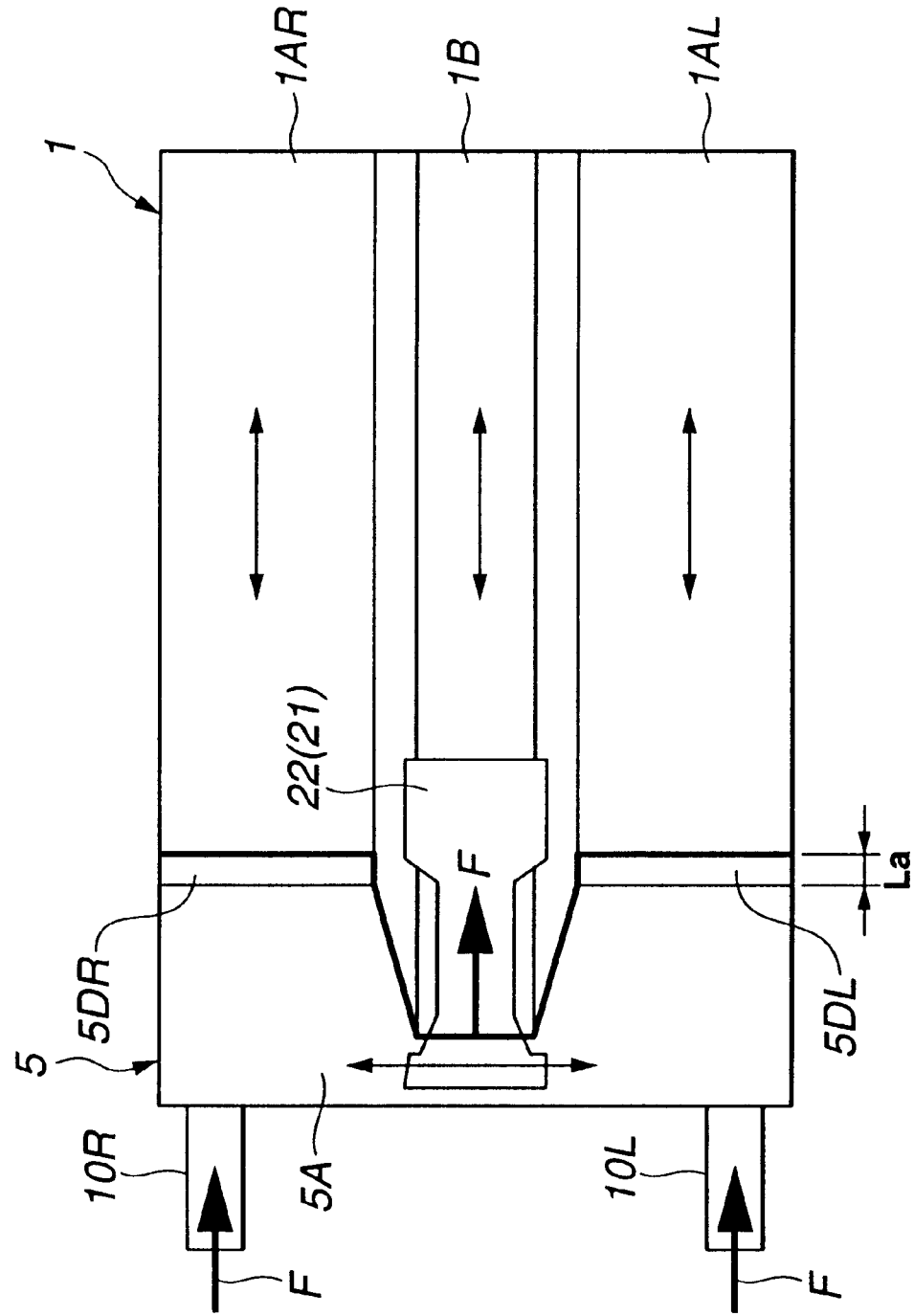
FIG. 16 is a simplified schematic plan view of the relationship between the front side members, the dash cross member and the floor of the first embodiment of the invention, illustrating a modification of the relationship between the dash cross member and the floor.
Figure 17:
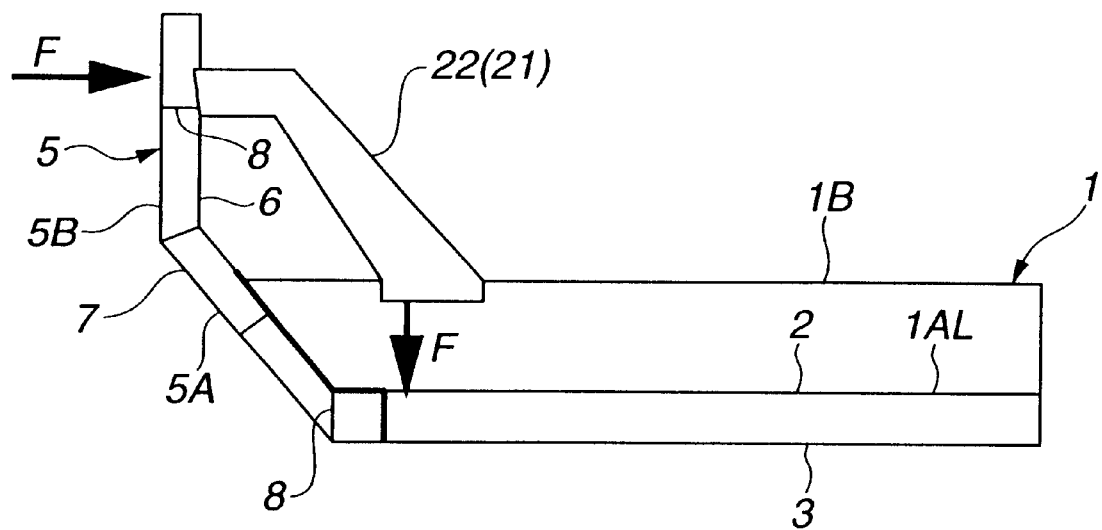
FIG. 17 is a simplified schematic side view of the dash cross member and floor shown in FIG. 16.
Figure 18:
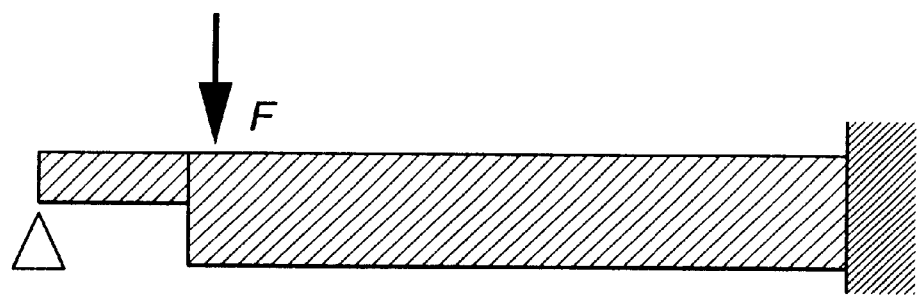
FIG. 18 is a beam model of the structure shown in FIGS. 16 and 17.

In FIG. 13, the reference letter L indicates the amount by which each of the teeth 5DL, 5DR extends beyond the lower edge of toe board section 5A, that is, the offset L also is the length of the recess of the floor 1 in the longitudinal direction. The rigidity of the floor 1 can be adjusted by varying the offset L. Thus, varying the offset L may vary cabin rigidity in response to vehicle weight. It is preferable that, as the vehicle weight increases, the cabin rigidity will also increase. Thus, as vehicle weight increases, the offset L should decrease. As demonstrated in FIGS. 16 to 18, decreasing the offset L to a small amount La, increases the flexure rigidity of the floor 1. Thus, the offset L can be adjusted to the desired amount depending on whether the flexure rigidity must be increased or decreased, which will then achieve the required cabin rigidity.

Second Preferred Implementation

Figure 19:
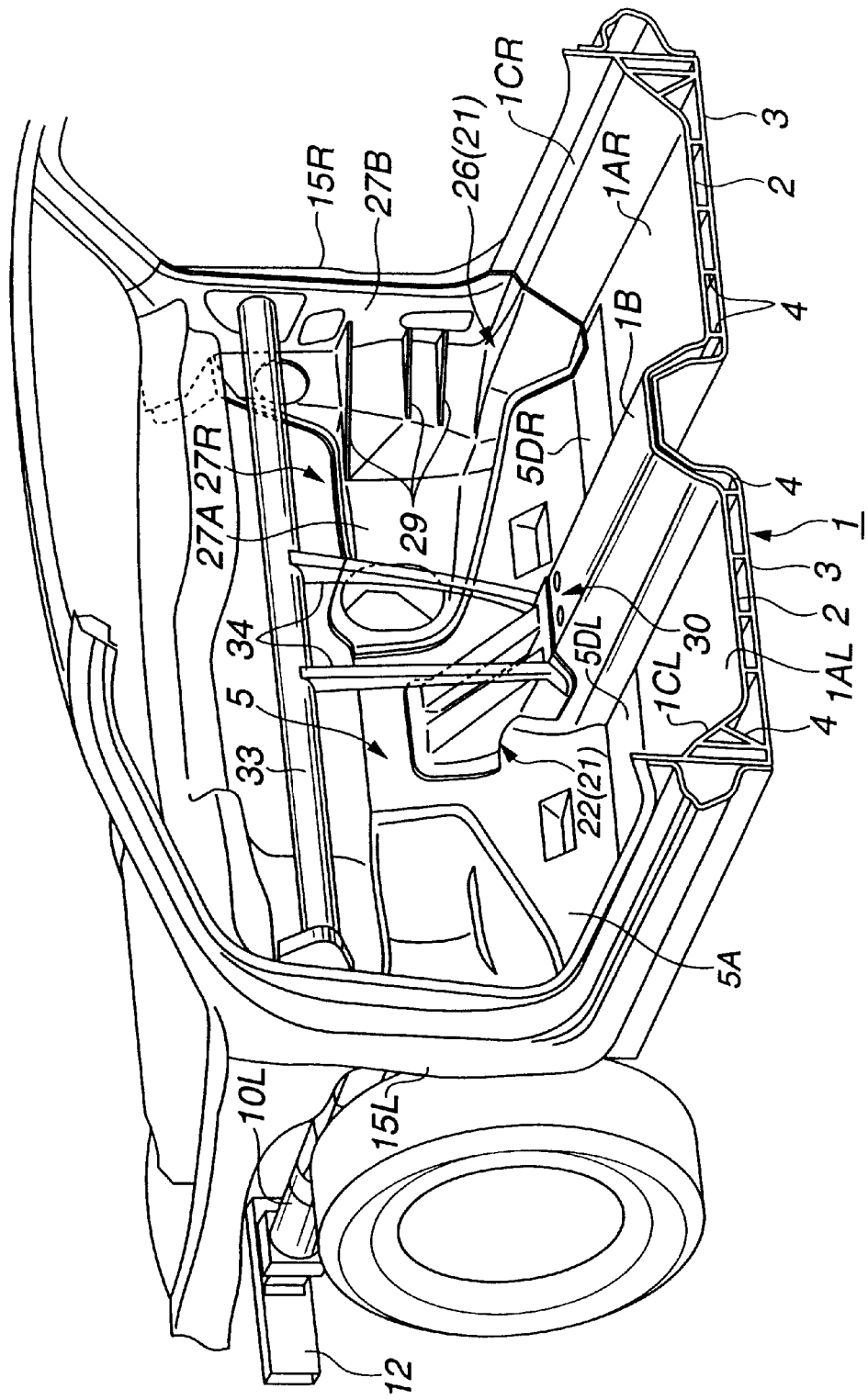
FIG. 19 is a sectional perspective view of the vehicle of FIG. 1 including a second embodiment of the present invention.
Figure 20:
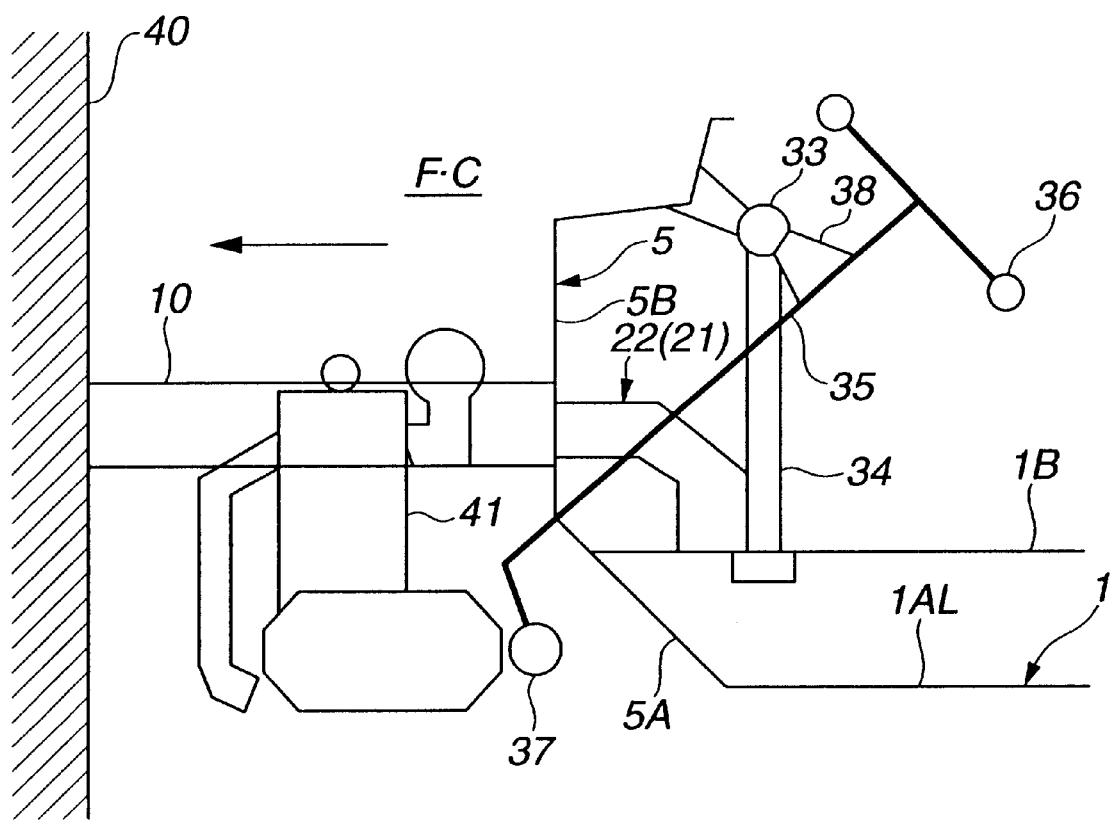
FIG. 20 is a view similar to FIG. 10A illustrating the position of parts of the second embodiment of the invention at the initiation of a frontal crash.

The second embodiment of the invention will now be described with reference to FIGS. 19 to 21. The second embodiment is substantially the same as the first embodiment with the addition of an instrument stay 34, which supports an instrument panel (not shown). The upper end of the instrument stay 34 is connected to a steering member 33. As best seen in FIG. 19, the ends of the steering member 33 are connected to the front pillars 15L, 15R. As seen in FIG. 20, the steering member 33 supports a steering column bracket 38 and a steering column 35. The steering column 35 is coupled to a steering wheel 36, which is disposed in the interior of the passenger compartment so that a driver can steer the vehicle. A steering rack 37 is disposed outside of the passenger compartment and is coupled to the steering wheel 36 via the steering column 35. The lower end of the instrument stay 34 is connected to the upper surface of tunnel 1B adjacent to the connecting point of. the reinforcement member 22 and the upper surface of the tunnel 1B.

Figure 21:
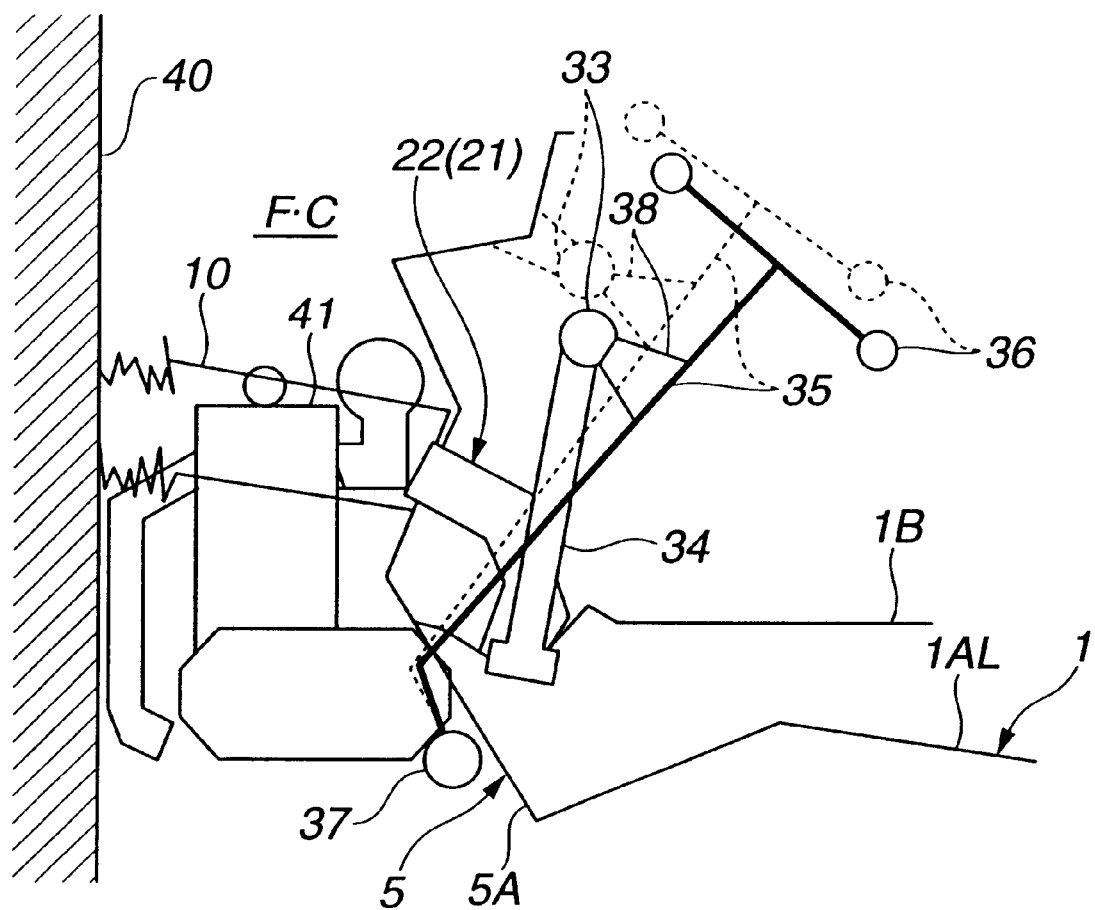
FIG. 21 is a view similar to FIG. 10C illustrating the position of parts of the second embodiment of the invention at the final stage of a frontal crash.

Prior to a crash, the steering mechanism is positioned as shown by the dotted lines in FIG. 21. During a frontal crash, the tunnel 1B is deformed by reinforcement member 22, which causes the instrument stay 34 and the steering member 33 to be drawn downward to the position shown in FIG. 21. As a result, the steering wheel is drawn downward and away from a vehicle operator, rather than being thrust toward the operator.

In each of the preceding embodiments, the tunnel 1B is formed as a dual-wall structure. If desired, however, a tunnel 1B constructed of a single wall may be used. If the single wall structure is used, then a conventional mechanical fastener, such as a bolt may be used to attach parts to the tunnel.

With regard to the floor 1, it may be constructed of a single extruded part or may be an assembly of different extruded parts. If a multiple part floor is used, then the floor may be assembled using a variety of techniques, such as welding or mechanical fastening (e.g., tongue and groove fastening).

The floor 1 being constructed from extruded parts of a light metal, such as an aluminum alloy, is effective in reducing the weight of the vehicle without decreasing the rigidity of the floor 1. In the preferred embodiment, the floor has two spaced walls and partitions to define a plurality of parallel channels that extend substantially parallel to the longitudinal centerline of the vehicle. Thus, the floor has a substantially uniform cross-section along its entire longitudinal length. When an input load is applied in the longitudinal direction, the floor is able to withstand, without any deformation, a load that is several times as great as the maximum load that may be applied at right angles to the surface of the floor without inducing any bending.

Although the invention has been described with reference to a limited number of embodiments, the scope of invention is not limited thereto. That is to say, various modifications and variations of the embodiment(s) described above will be readily self-evident to those skilled in the art given the preceding disclosure.

The content of disclosure of Japanese Patent Application No. 2000-040986, filed Feb. 18, 2000 is hereby incorporated by reference in its entirety.

What is claimed is:

1. A vehicle having a cabin and including a centerline extending in forward and rearward directions and a transverse line intersecting the centerline, comprising:

a cross member extending in a first direction parallel to the transverse line;

a floor connected to the cross member to partially define the cabin and extending in a second direction parallel to the centerline and having first and second side sills spaced from each other in the first direction and extending in the second direction, the first and second side sills having forward ends contacting the cross member; and a load-transmitting structure disposed between the cross member and the floor to apply an impact load from the cross member to the floor outward and away from the cabin, the load-transmitting structure including a first reinforcement member, the first reinforcement member including a first portion joined to the cross member at first height level and also including a second portion joined to an accelerator portion of the floor at a second height level, the accelerator portion of the floor being located inwardly in the second direction from an interface between the floor and the cross member, the first reinforcement member including a third portion extending over the interface and interconnecting the first and second portions, the first reinforcement member, the cross member and the floor being interconnected to form a rigid structure defining a space therein, the first height level being different from and higher than the second height level so as to cause the first reinforcement member to rotate upon deformation of the cross member toward the cabin, allowing application of a portion of the impact load to the accelerator portion of the floor at substantially right angles thereof, the accelerator portion being constructed and arranged as to initiate deformation of the floor upon application of a portion of the impact load to the accelerator portion of the floor to facilitate rotation of the rigid structure together with the first reinforcement member, wherein the floor has an upper layer and a lower layer disposed below the upper layer and substantially parallel to the upper layer, and a plurality of ribs connecting the upper and lower layers to define a plurality of channels, and said plurality of ribs extend in the second direction to the centerline.

2. A vehicle as claimed in claim 1, wherein the floor further includes a tunnel disposed between the first and second side sills substantially along the centerline and having a forward end contacting the cross member, the tunnel having the acceleration portion and forming a part of the rigid structure, wherein the first reinforcement member connects the cross member to the accelerator portion of the tunnel.

3. A vehicle as claimed 2, further comprising:

a steering member disposed through the cross member; and a stay having an upper end connected to the steering member and a lower connected to the tunnel in the vicinity of the accelerator of the tunnel.

4. A vehicle as claimed in claim 2, wherein the tunnel has only a single layer.

5. A vehicle is claimed in claim 1, wherein the load-transmitting structure further includes a second reinforcement member that connects the cross member to the first side sill and a third reinforcement member that connects the cross member to the second side sill.

6. A vehicle as claimed in claim 1, wherein the floor further includes a tunnel disposed between the first and second side sills substantially along the centerline and having a forward end contacting the cross member, the tunnel having the accelerator portion and forming a part of the rigid structure, wherein the first reinforcement member connects the cross member to the accelerator portion of the tunnel, wherein the load-transmitting structure includes a second reinforcement member that connects the cross member to the first side sill, and wherein the load-transmitting structure includes a third reinforcement member that connects the cross member to the second side sill.

7. A vehicle as claimed in claim 6, wherein each of the first, second, and third reinforcement members rotationally connects the cross member and the respective tunnel, first side sill and second side sill, such that each of the reinforcement members rotates when receiving an impact load.

8. A vehicle as claimed in claim 7, wherein the accelerator portion of the floor further includes a rotation limiting structure to limit rotation of each of the reinforcement members.

9. A vehicle as claimed in claim 4, further comprising first and second side members having rearward ends connected to the cross member, wherein during a frontal impact to the vehicle, the impact load resulting from the frontal impact is transmitted from the first and second side members to the cross member to the load-transmitting structure and to the floor.

10. A vehicle as claimed in claim 1, wherein the first reinforcement member includes, as the third portion, a plurality of elongate members extending in parallel from the cross member to the floor.

11. A vehicle as claimed in claim 1, wherein the load-transmitting structure includes second reinforcement members, each of which members includes a plurality of ribs disposed in parallel and connecting the cross member to one of the first and second side sills.

12. A vehicle as claimed in claim 1, wherein the accelerator portion is a deformation portion to initiate a deformation of the floor.

13. A vehicle as claimed in claim 12, wherein the deformation portion includes a weakened portion that is weaker than the remaining portion of the floor.

14. A vehicle as claimed in claim 12, wherein the deformation portion includes at least one aperture.

15. A vehicle as claimed in claim 12, wherein the deformation portion includes a recess.

16. A vehicle as claimed in claim 1, wherein the load-transmitting structure is connected to the upper layer of the floor.

17. A vehicle having a cabin and including a centerline extending in forward and rearward directions and a transverse line intersecting the centerline, comprising:

a cross member extending in a first direction parallel to the transverse line;

an extruded floor connected to the cross member to partially define the cabin and extending in a second direction parallel to the centerline and having first and second side sills spaced from each other in the first direction and extending in the second direction, the first and second side sills having forward ends contacting the cross member; and at least one load-transmitting member disposed between the cross member and the floor, each load-transmitting member applies an impact load from the cross member to the floor at substantially right angles to the floor, wherein the floor further includes a tunnel disposed between the first and second side sills substantially along the centerline and having a forward end contacting the cross member, and one load-transmitting member connects the cross member and the tunnel, wherein the cross member includes a vertical wall section extending substantially vertically, a toe board section extending rearward at an angle from the cross member, and first and second teeth extending rearward substantially horizontally from the toe board section, the floor further includes a first floor panel disposed between the first side sill and the tunnel and having a forward edge at least partially recessed from the forward ends of the first side sill and the tunnel to define a first recess that receives the first tooth, and the floor further includes a second floor panel disposed between the second side sill and the tunnel and having a forward edge at least partially recessed from the forward ends of the second side sill and the tunnel to define a second recess that receives the second tooth.

18. A vehicle as claimed in claim 17 wherein the first reinforcement member is connected to the floor forward of the forward edges of the first and second floor panels.

19. A vehicle as claimed in claim 18, wherein a length of the first and second teeth decreases as a weight of the vehicle increases.

20. A vehicle having a cabin and including a centerline extending in forward and rearward directions and a transverse line intersecting the centerline, comprising:

a cross member extending in a first direction parallel to the transverse line;

a floor connected to the cross member to partially define the cabin and extending in a second direction parallel to the centerline and having first and second side sills spaced from each other in the first direction and extending in the second direction, the first and second side sills having forward ends contacting the cross member; and means for transferring an impact load resulting from a vehicle impact from the cross member to the floor at substantially right angles to the floor, the load transferring means including a load-transmitting structure, the load-transmitting structure being joined to the cross member at first height level and also to an accelerator portion of the floor at a second height level, the load-transmitting structure, the cross member and the floor being interconnected to from a rigid structure defining a space therein, the first height level being different from and higher than the second height level so as to cause the load-transmitting structure to rotate upon deformation of the cross member toward the cabin, allowing application of the impact load to the accelerator portion of the floor at substantially right angles, the accelerator portion being constructed and arranged as to initiate deformation of the floor upon application of the impact load to the accelerator portion or the floor to facilitate rotation of the rigid structure together with the load-transmitting structure, wherein the floor has an upper layer and a lower layer disposed below the upper layer and substantially parallel to the upper layer, and a plurality of ribs connecting the upper and lower layers to define a plurality of channels, and said plurality of ribs extend in the second direction parallel to the centerline.

21. A vehicle having a cabin and including a centerline extending in forward and rearward directions and a transverse line intersecting the centerline, comprising:

a cross member extending in a first direction parallel to the transverse line;

a floor connected to the cross member to partially define the cabin and extending in a second direction parallel to the centerline and having first and second side sills spaced from each other in the first direction and extending in the second direction, the first and second side sills having forward ends contacting the cross member; and means for applying an impact load resulting from a vehicle impact from the cross member to the floor at substantially right angles to the floor to bend the cabin outwardly, the means having a load-transmitting structure including a reinforcement member, the reinforcement member being joined to the cross member at first height level and also to an accelerator portion of the floor at a second height level, the reinforcement member, the cross member and the floor being interconnected to form a rigid structure defining a space therein, the first height level being different from and higher than the second height level so as to cause the reinforcement member to rotate upon deformation of the cross member toward the cabin, allowing application of the impact load to the accelerator portion of the floor at substantially right angles, the accelerator portion being constructed and arranged as to initiate deformation of the floor upon application of the impact load to the accelerator portion of the floor to facilitate rotation of the rigid structure together with the reinforcement member, wherein the floor has an upper layer and a lower layer disposed below the upper layer and substantially parallel to the upper layer, and a plurality of ribs connecting the upper and lower layers to define a plurality of channels, and said plurality of ribs extend in the second direction parallel o the centerline.

22. A vehicle having a cabin and including a centerline extending in forward and rearward directions and a transverse line intersecting the centerline, comprising:

a cross member extending in a first direction parallel to the transverse line;

a floor connected to the cross member to partially define the cabin and extending in a second direction parallel to the centerline and having first and second side sills spaced from each other in the first direction and extending in the second direction, the first and second side sills having forward ends contacting the cross member; and means for bending the cabin outwardly during a vehicle impact, the means having a load-transmitting structure including a reinforcement member, the reinforcement member being joined to the cross member at first height level and also to an accelerator portion of the floor at a second height level, the reinforcement member, the cross member and the floor being interconnected to form a rigid structure defining a space therein, the first height level being different from and higher than the second height level so as to cause the reinforcement member to rotate upon deformation of the cross member toward the cabin, allowing application of an impact load to the accelerator portion of the floor at substantially right angles, the accelerator portion being constructed and arranged as to initiate deformation of the floor upon application of the impact load to the accelerator portion of the floor to facilitate rotation of the rigid structure together with the reinforcement member, wherein the floor has an upper layer and a lower layer disposed below the upper layer and substantially parallel to the upper layer, and a plurality of ribs connecting the upper and lower layers to define a plurality of channels, and said plurality of ribs extend in the second direction parallel to the centerline.

23. A vehicle having an engine compartment, a cabin extending rearward from the engine compartment, a rear compartment extending rearward from the cabin, a centerline extending in forward and rearward directions and a transverse line intersecting the centerline, comprising:

an extruded cross member extending in a first direction parallel to the transverse line and having:

a vertical wall section extending substantially vertically;

a toe board section extending rearward at an angle from the vertical wall section; and first and second teeth extending rearward substantially horizontally from the toe board section;

first and second side members having rear ends connected to the cross member to partially define the engine compartment;

an extruded floor connected to the cross member opposite the first and second floor members to partially define the cabin and extending in a second direction parallel to the centerline and having;

first and second side sills spaced from each other in the first direction and extending in the second direction, the first and second side sills having forward ends contacting the cross member;

a tunnel extending along the centerline between the first and second side sills and having a forward end contacting the cross member;

a first floor panel extending between the first side sill and the tunnel and having a forward edge recessed from the forward ends of the first side sill and the tunnel to define a first recess that receives the first tooth, and a second floor panel extending between the second side sill and the tunnel and having a forward edge recessed from the forward ends or the second side sill and the tunnel to define a second recess that receives the second tooth; and a load-transmitting structure including a first load-transmitting member disposed between the cross member and the tunnel such that during an impact, an impact load is transmitted from the first and second side members to the cross member to the tunnel at substantially right angles to the tunnel.

24. A vehicle as claimed in claim 23, wherein the load-transmitting structure further includes:

a second load-transmitting member disposed between the cross member and the first side sill such that during impact, the impact load is transmitted from the first and second side members to the cross member to the first side sill at substantially right angles to the first side sill; and a third load-transmitting member disposed between the cross member and the second side sill such that during impact, the impact load is transmitted from the first and second side members to the cross member to the second side sill at substantially right angles to the second side sill.

25. A vehicle as claimed in claim 24, further comprising:

a steering member disposed through the cross member; and a stay having an upper end connected to the steering member and a lower end connected to the tunnel in the vicinity of a connection point connecting the first load-transmitting member to the tunnel.

26. A vehicle body structure for a vehicle having a centerline extending in forward and rearward directions and a transverse line intersecting the centerline, comprising:

a cross member extending in a first direction parallel to the transverse line;

a floor connected to the cross member and extending in a second direction parallel to the centerline and having first and second side sills spaced from each other in the first direction and extending in the second direction, the first and second side sills having forward ends contacting the cross member; and a load-transmitting structure disposed between the cross member and the floor, the load-transmitting structure including a load-transmitting member that applies an impact load from the cross member to the floor at substantially right angles to the floor, the load-transmitting member being joined to the cross member at first height level and also to an accelerator portion of the floor at a second height level, the load-transmitting member, the cross member and the floor being interconnected to form a rigid structure defining a space therein, the first height level being different from and higher than the second height level so as to cause the reinforcement member to rotate upon deformation of the cross member toward the cabin, allowing application of an impact load to the accelerator portion of the floor at substantially right angles, the accelerator portion being constructed and arranged as to initiate deformation of the floor upon application of the impact load to the accelerator portion of the floor to facilitate rotation of the rigid structure together with the load-transmitting member, wherein the floor has an upper layer and a lower layer disposed below the upper layer and substantially parallel to the upper layer, and a plurality of ribs connecting the upper and lower layers to define a plurality of channels, and said plurality of ribs extend in the second direction parallel to the centerline.

27. A vehicle body structure as claimed in claim 26, wherein the floor further includes a tunnel disposed between the first and second side sills substantially along the centerline and having a forward end contacting the cross member, wherein the load-transmitting member connects the cross member to the tunnel.

28. A vehicle body structure as claimed in claim 27,
wherein the load-transmitting structure further includes a second load-transmitting member that connects the cross member to the first side sill, and
wherein the load-transmitting structure further includes a third load-transmitting member that connects the cross member to the second side sill.

29. A vehicle body structure for a vehicle having a centerline extending in forward and rearward directions and a transverse line intersecting the centerline, comprising:
a cross member extending in a first direction parallel to the transverse line;
a floor connected to the cross member and extending in a second direction parallel to the centerline; and
a load-transmitting structure disposed between the cross member and the floor, the load-transmitting structure including a reinforcement member,
the reinforcement member being joined to the cross member at first height level and also to an accelerator portion or the floor at a second height level,
the reinforcement member, the cross member and the floor being interconnected to form a rigid structure defining a space therein,
the first height level being different from and higher than the second height level so as to cause the reinforcement member to rotate upon deformation of the cross member toward the cabin, allowing application of the impact load to the accelerator portion of the floor at substantially right angles,
the accelerator portion being constructed and arranged as to initiate deformation of the floor upon application of the impact load to the accelerator portion of the floor to facilitate rotation of the rigid structure together with the reinforcement member,
wherein the floor has an upper layer and a lower layer disposed below the upper layer and substantially parallel to the upper layer, and a plurality of ribs connecting the upper and lower layers to define plurality of channels, and said plurality of ribs extend in the second direction parallel to the centerline.

30. A vehicle having a cabin and including a centerline extending in forward and rearward directions and a transverse line intersecting the centerline, comprising:
a cross member extending in a first direction parallel to the transverse line;
a floor connected to the cross member to partially define the cabin and extending in a second direction parallel to the centerline and having first and second side sills spaced from each other in the first direction and extending in the second direction, the first and second side sills having forward ends contacting the cross member; and
means for predeforming the floor outward to provide for increased absorption of an impact of an engine into the cabin during a vehicle collision, the means having a load-transmitting structure including a reinforcement member,
the reinforcement member being joined to the cross member at first height level and also to an accelerator portion of the floor at a second height level,
the reinforcement member, the cross member and the floor being interconnected to form a rigid structure defining a space therein,
the first height level being different from and higher than the second height level so as to cause the reinforcement member to rotate upon deformation of the cross member toward the cabin, allowing application of the impact load to the accelerator portion of the floor at substantially right angles,
the accelerator portion being constructed and arranged as to initiate deformation of the floor upon application of the impact load to the accelerator portion of the floor to facilitate rotation of the rigid structure together with the reinforcement member
wherein the floor has an upper layer and a lower layer disposed below the upper layer and substantially parallel to the upper layer and a plurality of ribs connecting the upper and lower layers to define a plurality of channels, and said plurality of ribs extend in the second direction parallel to the centerline.

31. A vehicle body structure for a vehicle having a centerline extending in forward and rearward directions and a transverse intersecting the centerline, comprising:
a cross member extending in a first direction, which is substantially parallel to the transverse line;
a floor connected to the cross member to partially define the cabin and extending in a second direction, which is substantially parallel to the centerline, and having first and second side sillies spaced from each other in the first direction and extending in the second direction, the first and second sills having forward ends contacting the cross member; and
a load-transmitting structure disposed between the cross member and the floor, the load-transmitting structure including a reinforcement member,
the reinforcement member being joined to the cross member at first height level and also to an accelerator portion of the floor at a second height level,
the reinforcement member, the cross member and the floor being interconnected to form a rigid structure defining a space therein,
the first height level being different from and higher than the second height level so as to cause the reinforcement member to rotate upon deformation of the cross member toward the cabin, allowing application of the impact load to the accelerator portion of the floor at substantially right angles,
the accelerator portion being constructed and arranged as to initiate deformation of the floor upon application of the impact load to the accelerator portion of the floor to facilitate rotation of the rigid structure together with the reinforcement member,
wherein the floor is formed by extrusion, the extruded direction being parallel to the centerline, and
the floor has an upper layer and a lower layer disposed below the upper layer and substantially parallel to the upper layer, and a plurality of ribs connecting the upper and lower layers to define a plurality of channels, and said plurality of ribs extend in the second direction parallel to the centerline.

32. A vehicle body structure for a vehicle having a centerline extending in forward and rearward directions and a transverse line intersecting the centerline, comprising:
a cross member extending in a first direction, which is substantially parallel to the transverse line;
a floor connected to the cross member to partially define the cabin and extending in a second direction, which is substantially parallel to the centerline; and a load-transmitting structure disposed between the cross member and the floor, the load-transmitting structure including a reinforcement member, the reinforcement member being joined to the cross member at first height level and also to an accelerator portion of the floor at a second height level the reinforcement member, the cross member and the floor being interconnected to form a rigid structure defining a space therein, the first height level being different from and higher than the second height level so as to cause the reinforcement member to rotate upon deformation of the cross member toward the cabin, allowing application of the impact load to the accelerator portion of the floor at substantially right angles, the accelerator portion being constructed and arranged as to initiate deformation of the floor upon application of the impact load to the accelerator portion of the floor to facilitate rotation of the rigid structure together with the reinforcement member, wherein the floor is formed by extrusion, the extruded direction being parallel to the centerline, and the floor has an upper layer and a lower layer disposed below the upper layer and substantially parallel to the upper layer, and a plurality of ribs connecting the upper and lower layers to define a plurality of channels, and said plurality of ribs extend in the second direction parallel to the centerline.

* * * * *